(12) United States Patent
Harrold et al.

(10) Patent No.: US 8,692,871 B2
(45) Date of Patent: *Apr. 8, 2014

(54) AUTOSTEREOSCOPIC DISPLAY APPARATUS

(75) Inventors: Jonathan Harrold, Hsin-Chu (TW); Graham John Woodgate, Hsin-Chu (TW); Ren-Wei Liao, Hsin-Chu (TW)

(73) Assignee: AU Optronics Corp., Hsinchu (TW)

( * ) Notice: Subject to any disclaimer, the term of this patent is extended or adjusted under 35 U.S.C. 154(b) by 665 days.

This patent is subject to a terminal disclaimer.

(21) Appl. No.: 13/011,455

(22) Filed: Jan. 21, 2011

(65) Prior Publication Data

US 2011/0181706 A1 Jul. 28, 2011

(30) Foreign Application Priority Data

Jan. 27, 2010 (GB) .................................. 1001344.9

(51) Int. Cl.
*H04N 13/04* (2006.01)
*G02B 26/00* (2006.01)

(52) U.S. Cl.
USPC ...................... 348/51; 359/290; 348/E13.026

(58) Field of Classification Search
USPC ........................................................ 359/290
See application file for complete search history.

(56) References Cited

U.S. PATENT DOCUMENTS

| | | | |
|---|---|---|---|
| 3,409,351 A | 11/1968 | Winnek | |
| 5,132,839 A * | 7/1992 | Travis | ............................ 359/462 |
| 5,602,658 A | 2/1997 | Ezra et al. | |
| 5,953,148 A | 9/1999 | Moseley et al. | |
| 6,064,424 A | 5/2000 | van Berkel et al. | |
| 7,058,252 B2 | 6/2006 | Woodgate et al. | |
| 8,134,590 B2 | 3/2012 | De Zwart et al. | |
| 8,259,241 B2 | 9/2012 | Van Berkel | |
| 8,345,088 B2 * | 1/2013 | Harrold et al. | .................. 348/51 |
| 2002/0126389 A1 * | 9/2002 | Moseley et al. | ............... 359/619 |
| 2009/0002262 A1 | 1/2009 | Fukushima et al. | |

FOREIGN PATENT DOCUMENTS

| | | |
|---|---|---|
| CN | 101263722 | 9/2008 |
| JP | 2008249887 | 10/2008 |
| JP | 2008539460 | 11/2008 |
| WO | 03/015424 A2 | 2/2003 |
| WO | 2007/031921 A1 | 3/2007 |

* cited by examiner

*Primary Examiner* — Andy Rao
*Assistant Examiner* — Tyler Edwards
(74) *Attorney, Agent, or Firm* — WPAT, PC; Justin King

(57) ABSTRACT

An autostereoscopic display apparatus includes a spatial light modulator in which alignment features such as bump features provide radially symmetric alignment of the molecules of the liquid crystal. A parallax element is arranged over the spatial light modulator to direct light from the pixels into different viewing windows. The apertures of the pixels are shaped such that, for each individual row of pixels, a notional line parallel to the geometric axes of the parallax elements has a total length of intersection with the pixels of the row, weighted for the intensity of light modulated by the alignment features, which is the same for all positions of the notional line. This improves angular intensity uniformity. The pixels may each include plural apertures, wherein the alignment features of the apertures of each individual pixel are offset from one another in a direction perpendicular to said geometric axes. This improves angular contrast uniformity.

19 Claims, 15 Drawing Sheets

AUTOSTEREOSCOPIC DISPLAY APPARATUS

RELATED APPLICATIONS

This application claims priority to British Application Serial Number 1001344.9, filed Jan. 27, 2010, which is herein incorporated by reference.

BACKGROUND

1. Field of Invention

The present invention relates to pixel structures for an autostereoscopic display apparatus. Such a display apparatus may be used in televisions, computer monitors, telecommunications handsets, digital cameras, laptop and desktop computers, games apparatus, automotive and other mobile display applications.

2. Description of Related Art

Normal human vision is stereoscopic, that is each eye sees a slightly different image of the world. The brain fuses the two images (referred to as the stereo pair) to give the sensation of depth. Three dimensional (3D) stereoscopic displays show a separate image to each of the eyes corresponding to that which would be seen if viewing a real world scene. The brain again fuses the stereo pair to give the appearance of depth in the image.

FIG. 1 shows in plan view a display surface in a display plane 1. A right eye 2 views a right eye homologous image point 3 on the display plane and a left eye 4 views a left eye homologous point 5 on the display plane to produce an apparent image point 6 perceived by the user behind the screen plane. If light from point 3 is seen by the left eye 4 and light from the point 5 is seen by the right eye 2 then a pseudoscopic image point 21 is produced. Pseudoscopic images are undesirable as they produce visual strain to observers.

FIG. 2 shows in plan view a display surface in a display plane 1. A right eye 2 views a right eye homologous image point 7 on the display plane and a left eye 4 views a left eye homologous point 8 on the display plane to produce an apparent image point 9 in front of the screen plane. Pseudoscopic image point 12 is produced if the right eye 2 can see light from point 8 and the left eye 4 can see light from point 7.

FIG. 3 shows the appearance of the left eye image 10 and right eye image 11. The homologous point 5 in the left eye image 10 is positioned on a reference line 12. The corresponding homologous point 3 in the right eye image 11 is at a different relative position 3 with respect to the reference line 12. The separation 13 of the point 3 from the reference line 12 is called the disparity and in this case is a positive disparity for points which will lie behind the screen plane. Similarly in the left eye image 10, the homologous point 8 is positioned on a reference line 14 while in the right eye image the corresponding homologous point 7 is laterally separated from the reference line 14 by a distance 15 with a negative disparity. Changing from the left eye image 10 to the right eye image 11, the movement of the homologous point 3 is to the right. This corresponds to an orthoscopic image point 6 behind the screen plane, while the movement of the homologous point 7 is to the left, corresponding to an orthoscopic image point 9 in front of the screen plane.

For a generalised point in the scene there is a corresponding point in each image of the stereo pair as shown in FIG. 3. These points are termed the homologous points. The relative separation of the homologous points between the two images is termed the disparity; points with zero disparity correspond to points at the depth plane of the display. FIG. 1 shows that points with uncrossed disparity appear behind the display and FIG. 2 shows that points with crossed disparity appear in front of the display. The magnitude of the separation of the homologous points, the distance to the observer, and the observer's interocular separation gives the amount of depth perceived on the display.

Stereoscopic type displays are well known in the prior art and refer to displays in which some kind of viewing aid is worn by the user to substantially separate the views sent to the left and right eyes. For example, the viewing aid may be color filters in which the images are color coded (e.g. red and green); polarising glasses in which the images are encoded in orthogonal polarization states; or shutter glasses in which the views are encoded as a temporal sequence of images in synchronisation with the opening of the shutters of the glasses.

Autostereoscopic displays operate without viewing aids worn by the observer. In autostereoscopic displays, each of the views can be seen from a limited region in space as illustrated in FIG. 4.

FIG. 4 shows a display device 16 with an attached parallax element 17. The display device 16 produces a right eye image 18 for the right eye channel. The parallax element 17 directs light in a direction shown by the arrow 19 to produce a right eye viewing window 20 in the region in front of the display. An observer places their right eye 22 at the position of the window 20. The position of the left eye viewing window 24 is shown for reference. The viewing window 20 may also be referred to as a vertically extended optical pupil.

FIG. 5 shows the left eye optical system. The display device 16 produces a left eye image 26 for the left eye channel. The parallax element 17 directs light in a direction shown by the arrow 28 to produce a left eye viewing window 30 in the region in front of the display. An observer places their left eye 32 at the position of the window 30. The position of the right eye viewing window 20 is shown for reference.

The parallax element 17 acts as an optical steering mechanism. The light from the left image 26 is sent to a limited region in front of the display, referred to as the viewing window 30. If a left eye 32 is placed at the position of the viewing window 30 then the observer sees the appropriate left eye image 26 produced by the display device 16. Similarly the optical system sends the light intended for the right image 18 to a right eye viewing window 20. If the observer places their right eye 22 in that window then the right eye image 18 produced by the display device 16 will be seen. Generally, the light from either image may be considered to have been optically steered (i.e. directed) into a respective directional distribution.

In this application the term "3D" is used to refer to a stereoscopic or autostereoscopic image in which different images are presented to each eye resulting in the sensation of depth being created in the brain. This should be understood to be distinct from "3D graphics" in which a 3D object is rendered on a two dimensional (2D) display device and each eye sees the exact same image.

The parallax element 17 may be switchable between a state in which it provides a 3D image and a state in which it has substantially no optical effect to allow selective display of 3D and 2D images. In this application the term "2D/3D" is used to refer to a display apparatus in which the function of the optical element can be so switched to enable a full resolution 2D image or a reduced resolution autostereoscopic 3D image.

FIG. 6 shows in plan view a display apparatus comprising a display device 16 and parallax element 17 in a display plane 34 producing the left eye viewing windows 36, 37, 38 and right eye viewing windows 39, 40, 41 in the viewing window plane 42. The separation of the window plane from the display device 16 is termed the nominal viewing distance 43.

The viewing window 37 and viewing window 40 in the central position with respect to the display device 16 are in the zeroth lobe 44. Left eye viewing window 36 and right eye viewing window 39 located to the right of the zeroth lobe 44 are in the +1 lobe 46, while left eye viewing window 38 and right eye viewing window 41 located to the left of the zeroth lobe are in the −1 lobe 48.

The viewing window plane 42 of the display apparatus represents the distance from the display device 16 at which the lateral viewing freedom is greatest. For points away from the display plane 34, there are diamond shaped autostereoscopic viewing zones, as illustrated in plan view in FIG. 6. As can be seen, the light from each of the points across is beamed in a cone of finite width to the viewing windows. The width of the cone may be defined as the angular width.

The parallax element 17 serves to generate a directional distribution of the illumination at the viewing window plane 42 at a defined distance 43 from the display device 16. The variation in intensity across the viewing window plane 42 constitutes one tangible form of a directional distribution of the light.

If an eye is placed in each of a pair viewing zones such as left eye viewing window 37 and right eye viewing window 40, then an autostereoscopic image will be seen across the whole area of the display. To a first order, the longitudinal viewing freedom of the display is determined by the length of these viewing zones.

The variation in intensity (or luminance) $\alpha$ 50 across the window plane of a display (constituting one tangible form of a directional distribution of the light) is shown with respect to position x 51 for idealised windows in FIG. 7. The right eye window position intensity (or luminance) function (or distribution) 52 corresponds to the right eye viewing window 41 in FIG. 6, and intensity (or luminance) function 53 corresponds to the left eye viewing window 37, intensity (or luminance) function 54 corresponds to the right eye viewing window 40 and intensity (or luminance) function 55 corresponds to the left eye viewing window 36. The integrated intensity (or luminance) function, 60 is the sum of the intensity (or luminance) from the individual intensity (or luminance) function 52, 53, 54, 55 with respect to the locations of the individual windows 41, 37, 40, 36 and further adjacent windows.

FIG. 8 shows the integrated intensity function 60 with position x 51 schematically for more realistic windows. The right eye window position intensity function 56 corresponds to the right eye viewing window 41 in FIG. 6, and intensity function 57 corresponds to the left eye viewing window 37, intensity function 58 corresponds to the right eye viewing window 40 and intensity function 59 corresponds to the left eye viewing window 36. The ratio of the variation from an integrated nominal intensity function 60 to the nominal intensity in an angular range is termed the angular intensity uniformity (AIU) or alpha ($\alpha$) function. The nominal intensity function may be for example a flat Luminance function as shown in FIG. 7, a Lambertian function, or some other function with a substantially smoothly varying intensity profile. The AIU may be measured over a limited range of viewing angles, or over the entire angular range of output angles of the respective display.

FIG. 9 shows a further intensity function 61 in which substantially triangular shaped viewing windows are overlapped in order to produce a flat integrated intensity (or luminance) function 60. Advantageously, such windows can provide a robust means by which to reduce non uniformities in the function 60. Further such windows reduce image flipping artefacts in which the image content appears to rapidly change from one view to another in multi-view displays, causing an apparent rotation of the image to an observer.

Several 3D artefacts can occur due to inadequate window performance, particularly for overlapping windows. Pseudoscopic images occur when light from the right eye image is seen by the left eye and vice versa. This is a significant 3D image degradation mechanism that can lead to visual strain for the user. Overlapping windows are seen as image blur, which limits the useful amount of depth that can be shown by the display. Additionally, poor window quality will lead to a reduction in the effective viewing freedom of the observer. The optical system is designed to optimise the performance of the viewing windows.

In displays with multiple views, adjacent windows contain a series of view data. As an observer moves laterally with respect to the display device, the images seen by each eye vary so that the appearance of a 3D image is maintained. Human observers are sensitive to variation in luminance as they move with respect to the display. For example, if the integrated intensity (or luminance) function 60 varies by more than 0.5%-5% of the maximum, then the display will appear to flicker. Thus it is desirable to minimise the variation of the integrated intensity (or luminance) function 60. As the function varies with the viewing angle, the uniformity of the function may be referred to as the angular intensity uniformity (AIU) which is an important performance parameter.

The respective images are displayed at the display plane 34, and observed by an observer at or near the viewing window plane 42.

There will now be discussed some known techniques for improving the AIU of a display.

One type of prior art pixel configuration for autostereoscopic display apparatus uses the well known stripe configuration as shown in FIG. 10a as used for standard 2D displays. The pixels apertures 62 are arranged in columns of red pixels 65, green pixels 67 and blue pixels 69. To generate an autostereoscopic display, a parallax element 172 such as a lenticular array is aligned with groups of color pixels 65, 67 and 69 as shown. The cusp 71 between the lenses of the array is one example of the geometric axis of the array of parallax elements.

The parallax element 172 may be slanted so that the geometric axes of the optical elements (e.g. lenses in the case of a lenticular array) of the parallax element 172 are inclined to the vertical column direction of the pixel apertures 62, as described for example in U.S. Pat. No. 3,409,351 and U.S. Pat. No. 6,064,424. Such an arrangement enables overlapping of windows, similar to that shown in FIG. 9, that results in a better uniformity of the integrated intensity (or luminance) function 60 of intensity compared to a parallax element in which the geometric axes of the optical elements are parallel to the vertical column direction of the pixel apertures.

Herein, a line parallel to the geometric axes of the optical elements of a parallax element is termed a "ray line", being a line along which rays of light are nominally (ignoring aberrations) directed from a display device to the same relative horizontal position in the viewing window plane at any one vertical position in the viewing window plane, rather than being the direction of a ray of light. FIG. 10a further shows the inclined orientation of the ray lines 64 and the geometric axes of the optical elements of the parallax element 172 with respect to the pixel apertures 62. Such an arrangement will generate windows that are tilted with respect to the vertical such that the view data will appear to change as the observer moves vertically.

FIG. 10a further includes a graph of the resultant overlap (or intersection) of ray lines 64 with the pixel aperture function providing an intensity function termed herein the zeta (ζ) function 73. The zeta (ζ) function 73 varies with position y 49 in the pixel plane. As will be described below, this is related to the window intensity function alpha (α) 50 at positions x 51 across the window plane 42.

For ease of understanding, the positions y 49 where a ray line 64 crosses the function 75 correspond to horizontal position y 49 into which light is directed from the ray line 64. The intensity function 75 of the zeta (ζ) function 73 has an intensity which is generally flat but which has peaks 74 whose origin has been appreciated as follows.

The zeta (ζ) function at each given position y 49 can be determined by measuring the total intersection length 66, 68, 70, 72 (shown in bold lines) of the ray lines 64 corresponding to that position y 49 across adjacent pixel apertures 62. This is because, in operation, the parallax element 172 collects light from a ray line 64 and directs it all towards a position in space where that light is observed by the viewer.

In fact an eye receives light from a bundle of ray lines 64 from a region, or spot at the pixel plane due to the pupil size, lens aberrations and lens focus condition so the actual window integrated intensity function alpha (α) 60 observed is a convolution of the zeta (ζ) function 73 with the spot function, sigma (σ), but this will still have similar peaks. Thus as the integrated intensity function 60 varies as the total intersection length varies due to the ray line 64 varyingly covering different amounts of the pixel apertures 62 and the gaps therebetween. In particular, the intensity function 75 includes elevated levels where the total intersection length is high because the ray line 64 intersects more of the pixel apertures 62 in the corner thereof.

As can be seen, the total intersection length 66, 68, 70, 72 can include contributions from two adjacent pixel apertures 62. While these adjacent pixels may have two different colors, each will have a corresponding pixel of the same color in the unit cell structure of the 3D image. So, the adjacent pixels can conveniently be used to form an understanding of the total intersection length within a single color.

In some known systems with non-uniform zeta (ζ) intensity function 75 where the parallax element 172 is a lenticular array, the lenses may be defocussed in order to smooth the alpha (α) integrated intensity function 60, effectively by providing an average of the different intersection lengths 66 of different ray lines 64. However, such an approach creates an increased overlap between the 3D windows and results in increased levels of image blur, reduced useful depth and increased pseudoscopic images. It is therefore desirable to maintain a high AIU without increasing the defocus of the lenses.

WO-2007/031921 discloses a technique by which the features such as peaks 74 in the intensity function 75 are reduced by means of a pixel cut-out 76 as shown in FIG. 10b. The cut-out 76 compensates for the increased intersection which otherwise occurs in the corner of the pixel aperture 62 reducing the total intersection length 78 for those ray lines 80 and thereby flattening the zeta (ζ) intensity function 75. However, such an arrangement cannot be used to compensate the output of wide viewing angle displays, as will be shown below.

Conventional Liquid Crystal Display (LCD) panels such as twisted nematic Liquid Crystal Display (TN-LCD) with homogeneous alignment use substantially rectangular pixel aperture shapes in which the whole of the pixel operates as a single domain such that the angular contrast properties of the optical output are substantially constant for each part of the pixel. Such pixels are well suited to the rectangular cutout approach to improve uniformity of integrated intensity function 60. However, such panels suffer from significant variations of contrast with viewing angle due to the restrictions of the optical performance of a single liquid crystal alignment domain within the cell. To compensate for such viewing angle effects, one approach is to use Vertical Aligned (VA) LC materials in combination with multiple domain structures and further complex alignment modification techniques. In this case each pixel comprises plural domains having different alignments of the liquid crystal molecules. The contrast properties with viewing angle of the display are determined by the addition of contrast properties from the individual domains.

One approach for improving the AIU is for the display to implement a radially symmetric mode. In this case, the apertures (displaying area) of the pixels of the spatial light modulator comprise an alignment feature, such as a bump feature, that provides radially symmetric alignment of the molecules of the liquid crystal. In general such a display has the capability of improving the angular characteristics of the display apparatus.

SUMMARY

According to the present invention, there is provided an autostereoscopic display apparatus comprising:

a spatial light modulator having an array of individually addressable pixels of different colors arranged in rows and columns, each pixel comprising at least one aperture that contains liquid crystal and has an alignment feature arranged to provide radially symmetric alignment of the molecules of the liquid crystal; and a parallax element comprising an array of optical elements arranged over the spatial light modulator to direct light from the pixels into different viewing windows, the optical elements having geometric axes extending in parallel across the spatial light modulator transversely to said rows in which the pixels are arranged;

wherein the apertures are shaped such that a notional line parallel to the geometric axes of the parallax elements has a total length of intersection with the pixels of the same color that are adjacent along the notional line, which total length of intersection is the same for all positions of the notional line, when the length of intersection is weighted across said alignment features by the intensity of light modulated by the alignment feature expressed as a fraction of the intensity of light modulated by the remainder of the pixel.

This improves the AIU and ACU of the display apparatus as a result of the total intensity weighted length of intersection of notional lines parallel to the geometric axes of the cylindrical lenses with each individual pixel, being the same for all positions of the notional line. In operation, the parallax element collects light from one of the notional lines (a ray line) and directs it all towards a position in space where that light is observed by the viewer (or more strictly speaking an eye receives light from a bundle of ray lines due to the pupil size, lens aberrations and lens focus condition so the actual intensity observed is a convolution with the zeta (ζ) function). Thus, the total intersection length being the same for all positions of the notional line means that the intensity of the observed light is the same for different viewing positions when each pixel has the same transmission setting (for example on a white image). In achieving this condition, the length of intersection is weighted across said alignment features by the intensity of light modulated by the alignment feature expressed as a fraction of the intensity of light modulated by the remainder of the pixel. This is based on an appreciation of the phenomenon that the bump alignment feature might not provide the same intensity as the remainder of the pixel and compensates for that phenomenon.

Advantageously, each pixel comprises plural apertures, each of which comprises liquid crystal and a said alignment feature in the liquid crystal, wherein the alignment features of the apertures of each individual pixel are offset from one another in a direction perpendicular to said geometric axes.

With this feature, the ACU for different viewing angles is improved for the following reason. This advantage arises because the alignment features provide radially symmetric alignment of the molecules of the liquid crystal. As a result, each of the notional lines crosses molecules of the liquid crystal that are aligned differently, depending on the position of the notional line with respect to the alignment feature. The different alignment causes variation in the contrast of the light collected from the different notional lines and observed by a viewer at a corresponding viewing position, hence generating angular contrast non-uniformities. The uniformity of contrast with respect to position x 51 in the window plane is termed the angular contrast uniformity, ACU or beta ($\beta$) function. However, this effect is reduced by the alignment features of the apertures of each individual pixel being offset from one another in a direction perpendicular to said geometric axes. In particular, across the range of possible positions of the notional lines, there is an averaging of the alignment of molecules of liquid crystal so that variations in contrast with viewing angle are minimized.

In addition, these advantages may be achieved without the need to defocus the optical elements, enabling the focus of the parallax element to be set to provide a small image of a notional observer's eye at the pixel plane so as to reduce blurring between viewing windows. Advantageously this improves 3D image quality by reducing the intensity of pseudoscopic images and also reduces the blur of images themselves.

The enhanced AIU and ACU improve the performance of the display apparatus. It may provide various advantages depending on the configuration of the display apparatus. Such advantages include, for example reducing image blur, and/or allowing increased levels of depth to be shown. The invention has particular value in an autostereoscopic multiview display apparatus in enabling the display apparatus to be free of visible flicker for a moving observer. Thus an observer moving with respect to the display will not see the display appear to flicker as they move, or see intensity changes across the display area.

In a switchable 2D/3D autostereoscopic display apparatus, besides such advantages in the 3D mode, the AIU and ACU in the 2D mode may also be improved; and the manufacturing and design of switchable parallax element may be relaxed; having the results of lower cost, higher yield and/or relaxed tolerances. In a switchable 2D/3D autostereoscopic display apparatus, using a birefringent lens array as the parallax element, the refractive index matching requirement of the lens array may be relaxed and/or the polarization switcher performance at high angles may be relaxed.

BRIEF DESCRIPTION OF THE DRAWINGS

Embodiments of the present invention will now be described, by way of example only, with reference to the accompanying drawings, in which:

FIG. 10b shows a modified pixel structure to improve the AIU of the display of FIG. 10a;

DETAILED DESCRIPTION

Figure 10A:
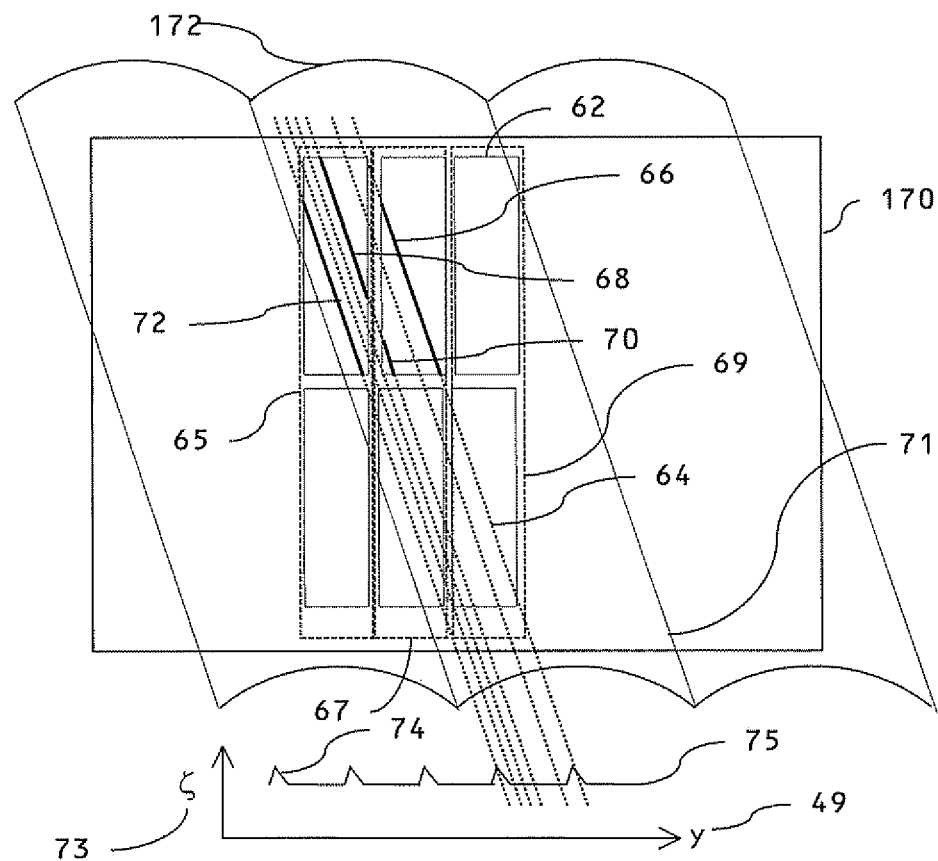
FIG. 10a shows an autostereoscopic display comprising a lenticular lens array aligned at a tilted angle to a pixel array.

FIG. 10a shows one known arrangement of a lenticular screen aligned with a pixel array to provide an autostereoscopic display apparatus. The lenticular screen 172 comprises slanted elongate lenticular elements arranged over and aligned to a spatial light modulator 170 comprising an array of pixels 62 each comprising in this example a single aperture. The individually addressable pixels 62 are of different colors and are arranged with a repeating unit of pixels that repeats in a horizontal row direction and in a vertical column direction. Thus the optical elements of the lenticular screen 172 have geometric axes extending in parallel across the spatial light modulator in a direction inclined at an angle with respect to the column direction which in this case is the vertical direction. For example the pixels comprise columns 65 of red pixels, columns 67 of green pixels and columns 69 of blue pixels.

A lenticular screen is a type of parallax element that may comprise an array of vertically extended cylindrical microlenses and directs light from the pixels into different viewing windows. The term "cylindrical" as used herein has its normal meaning in the art and includes not only strictly spherical lens shapes but also aspherical lens shapes. The pitch of the lenses again corresponds to the viewpoint correction condition so as to provide viewing windows at the correct viewing distance. The curvature of the lenses is set substantially so as to produce an image of the LCD pixels at the window plane. As the lenses collect the light in a cone from the pixel and distribute it to the windows, lenticular displays have the full brightness of the base panel.

A cylindrical lens describes a lens in which an edge (which has a radius of curvature) is swept in a first linear direction. The geometric axis of the cylindrical lens is defined as the line along the centre of the lens in the first linear direction, i.e. parallel to the direction of sweep of the edge 71. Notional lines parallel to the geometric axis are called ray lines 64. The overlap (or intersection) of the notional ray line 64 with the pixel aperture 62 provides information relating to the angular intensity uniformity and angular contrast uniformity properties of the display.

Thus the overlap 72 of one ray line 64 with a pixel aperture 62 of the column of pixels 65 may have the same length or size as that of the overlap 66 of the ray line 64 with the pixel aperture 62 of the column of pixels 67 at the equivalent position, wherein the column of pixels 67 is adjacent to the column of pixels 65. However, this overlap 72 may be different from the overlap 68 of a ray line 64 at a different position across the pixel aperture 62. In fact, the total overlap between the pixel apertures 62 can typically be considered by investigating the overlap between any two laterally adjacent pixel apertures 62 for one single ray line 64. Thus the total overlap is given by the summation of overlaps 68 and 70.

The plot of overlap line length zeta ($\zeta$) 73 across ray line position y 49 relative to pixel position in the pixel apertures 62 is termed the zeta ($\zeta$) function 75. As can be seen in FIG. 10a, the rectangular pixel apertures 62 provide a peak 74 of increased intensity. When imaged to the viewing window plane 42 by the lenticular screen, this results in an increased window intensity at certain viewing positions. Thus, as an observer moves across the viewing window plane 42, the intensity of the display will vary causing image flicker. Such an artefact is undesirable as the eye is very sensitive to such levels of flicker. For example, an intensity artefact of less than 0.5%-5% in the integrated intensity (or luminance) function 60 may be visible to a moving observer. It is thus desirable to reduce this effect as much as possible by providing a high uniformity zeta ($\zeta$) function (intensity function) 75.

Figure 10B:
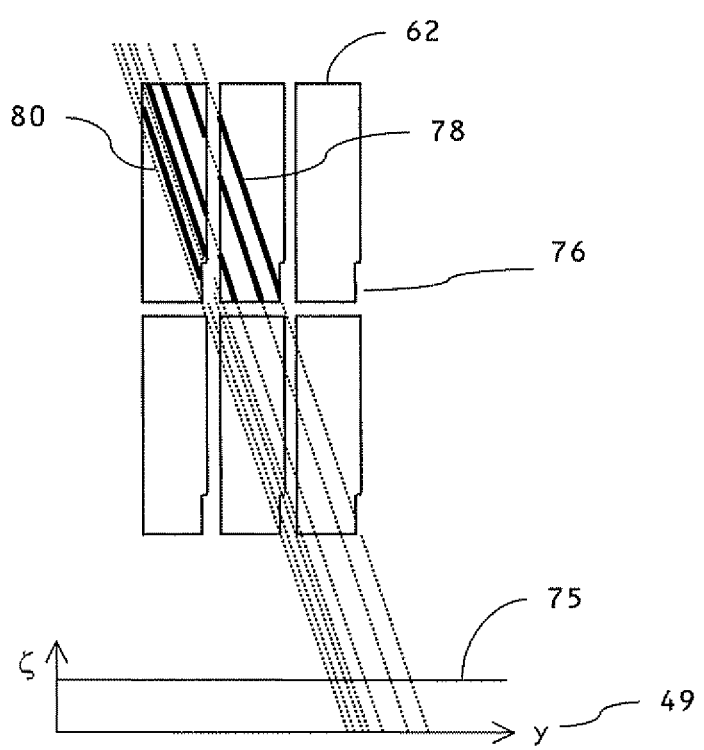

One known means to improve the zeta uniformity is shown in FIG. 10b. In this case, the peaks 74 of zeta ($\zeta$) (notional ray line overlap with pixel aperture function) are minimized by rectangular cut-outs 76. Thus the AIU will have high uniformity. As will be shown, such a technique does not provide high AIU for radially symmetric liquid crystal modes. Further, as will be shown below, such a technique does not compensate for angular contrast uniformity (ACU) effects.

Figure 9:
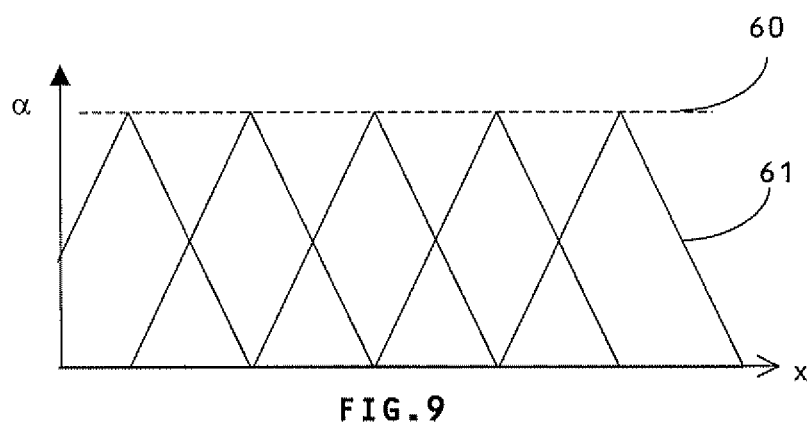
FIG. 9 shows another schematic of the output profile of viewing windows from an autostereoscopic 3D display.

In autostereoscopic displays that use slanted lenses, the angle of the notional ray line with respect to the rows and columns of pixels may be determined by considering various desired properties of the 3D image for a given arrangement of color pixels. For example, with pixels in which the red, green and blue pixels are of equal size and together form a square color pixel unit cell with size 3 units horizontally and 3 units vertically, a ray line that is at an angle of 1 unit horizontally and 3 units vertically has an angle of 18.43 degrees to the vertical and provides windows which overlap to a first extent. Reducing the angle to 9.46 degrees by setting the ray line with an angle of 1 unit horizontally and 6 units vertically increases the overlap between adjacent windows (broadens the base of the triangular window structure of FIG. 9). Broader windows will show increased view overlap so that undesirably pseudoscopic images are more likely to occur, as well as increasing the amount of blur in images. However, such an image will vary more smoothly as an observer moves laterally with respect to the display as well as having a greater vertical viewing freedom compared to the angle of 18.43 degrees. The two different angles also provide pixels with different spatial frequency information which can modify the fidelity of the 3D image. Alternative angles are also possible with the display properties modified as required.

In general, the ray lines (i.e. geometric axes of the optical elements) are inclined at an angle such that displacement of the geometric axes in the row direction by the pitch of the pixels in the row direction occurs within the pitch of the pixels in the column direction multiplied by a non-zero integer. For example, where the column direction is perpendicular to the row direction, this means that the geometric axes of the optical elements are inclined with respect to the column direction at an angle equal to arctan(pr/(pc·n)), where pr is the pitch of the pixels in the row direction, pc is the pitch of the pixels in the column direction, and n is a non-zero integer. The angles of 18.43 degrees and 9.46 degrees mentioned above correspond to the cases that n is 1 or 2, respectively.

Figure 11A:
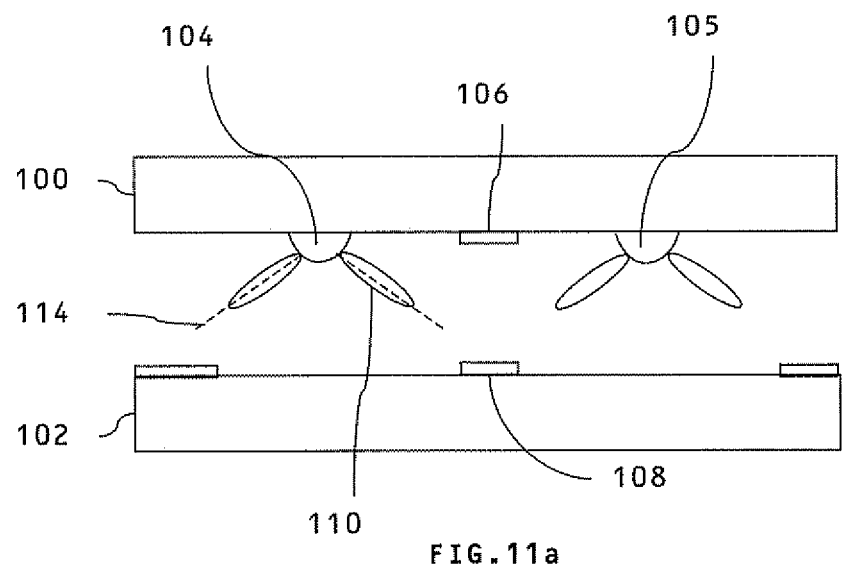
FIG. 11a shows in cross section liquid crystal alignment in a radially symmetric mode spatial light modulator.

The spatial light modulator is a radially symmetric mode liquid crystal display device comprising an array of pixels arranged in rows and columns (as shown in more detail below) providing radially symmetric alignment of the molecules of liquid crystal. FIG. 11a shows in cross section of part of an example of such a radially symmetric mode to spatial light modulator. A liquid crystal layer is sandwiched between substrates 100, 102. The liquid crystal molecules 110 are aligned with tilted director orientation 114 by bump features 104 that protrude into the liquid crystal layer from the substrate 100. Between adjacent bump features 104, 105 the liquid crystal directors are required to undergo relatively discontinuous tilts, thus causing disclinations in the alignment. Such disclinations cause scattering that degrade image contrast. Light blocking layers 108 and 106 shield regions of liquid crystal disclinations and addressing electronics to optimise display contrast.

Figure 11B:
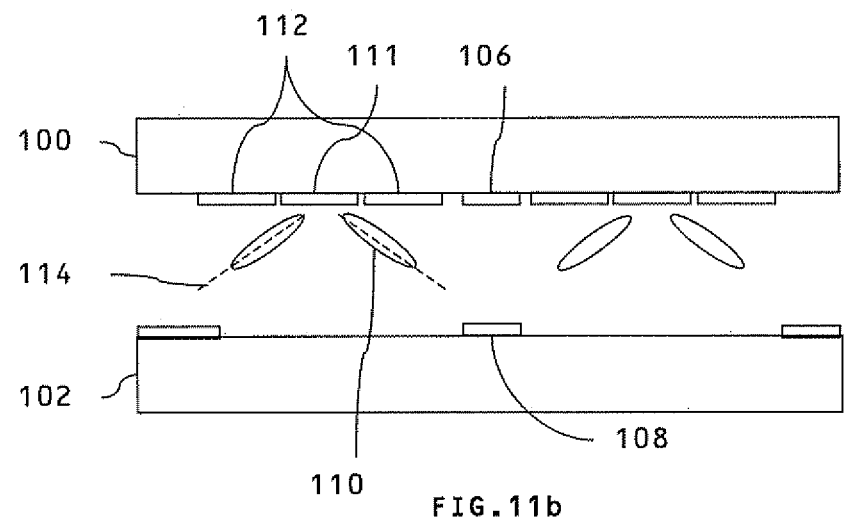
FIG. 11b shows in cross section liquid crystal alignment in another radially symmetric mode spatial light modulator.

The bump features 104, 105 are a type of alignment feature that provides a radially symmetric liquid crystal alignment. Such an alignment may be produced by bump features 104, 105 that are physical bumps as shown in FIG. 11a. However the radially symmetric alignment may be produced in other manners by other types of alignment feature, such as by a change in the alignment layer properties without the need for a physical bump, as shown for example in FIG. 11b. FIG. 11b shows in cross section liquid crystal alignment in another radially symmetric mode spatial light modulator. In regions 112, the alignment properties are different to region 111 so that the resultant alignment away from the region 111 is substantially the same as shown in FIG. 11a away from the bump feature 104. The region 111 is thus a different form of alignment feature.

The alignment feature may also be produced by an electrode pattern or a pyramid shape for example, but still produce an essentially radially symmetric liquid crystal alignment. In this specification the term "alignment feature" is defined to include the above options either singularly or in any combination. In each case, a further light blocking layer or partial light blocking layer may be incorporated in the region of the alignment feature to remove the visibility of alignment defects such as disclinations.

Figure 12:
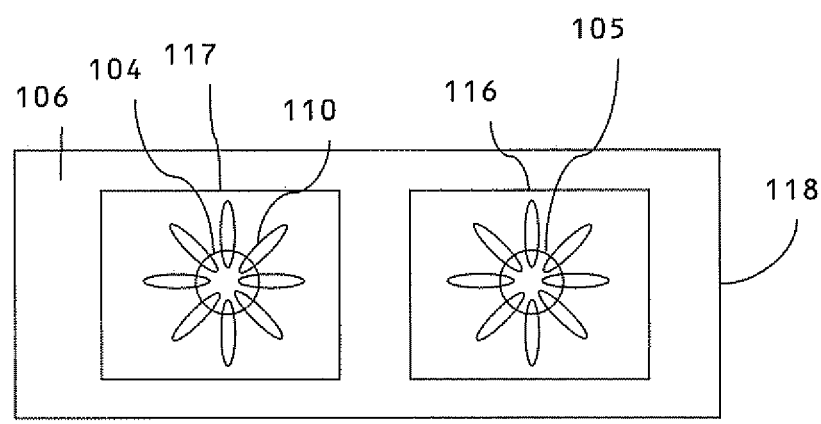
FIG. 12 shows in plan view liquid crystal alignment in a radially symmetric mode spatial light modulator.

In plan view of a single pixel 118 as shown in FIG. 12, the single pixel 118 has two apertures 116, 117 for example, but not limited herein. The bump features 104, 105 may be circular and the light blocking layer 106 may comprise apertures 116, 117 each comprising a single bump feature 104. The liquid crystal molecules take a radially is symmetric alignment at the bump features as shown. The pixel 118 with apertures 116, 117 is addressed with a single addressing voltage so that the driving of the liquid crystal molecules in each sub-aperture is typically identical. Thus addressable pixels that comprise multiple bump features comprise multiple pixel apertures to reduce the effects of scatter.

Across the area of each of the apertures 116, 117, the liquid crystal molecules are arranged with a set of tilts as a result of the alignment of the liquid crystal molecules at the surface of the bump and the propagation of the alignment across the pixel aperture. As will be described with reference to FIG. 14, each tilt contributes to an optimized contrast at a particular viewing angle. In the 2D mode of operation, the summation of the contribution from each tilt contributes to a more uniform viewing mode than for example the twisted nematic (TN) mode in which a single tilt is present across the whole of the pixel. Thus, in the 2D mode of operation, radially symmetric modes have a higher uniformity of contrast with viewing angle than TN mode devices. As will be shown, this property is not preserved when a conventional radial symmetric mode LCD is combined with an elongate parallax optic such as a parallax barrier or lenticular screen.

Figure 13A:
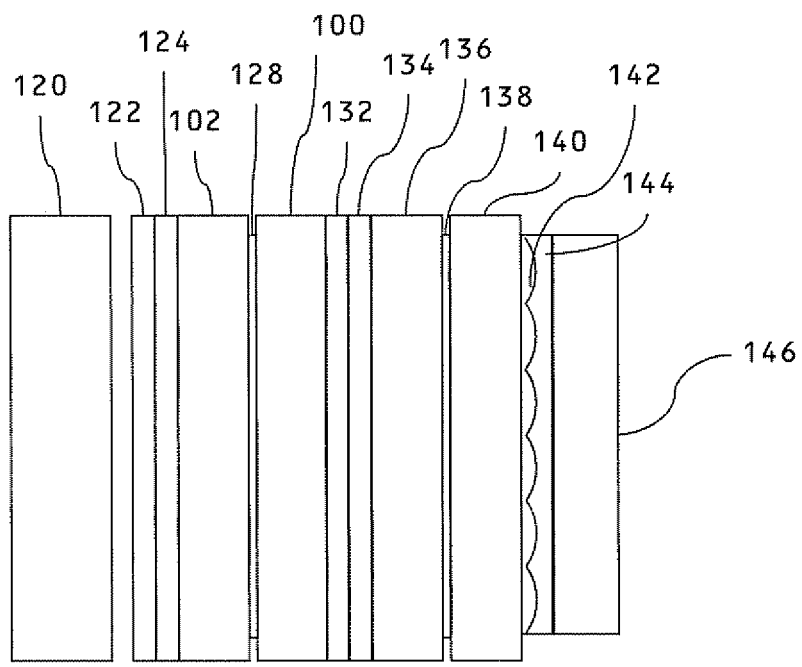
FIG. 13a shows in cross section a switchable lenticular autostereoscopic display is using a spatial light modulator of FIGS. 11 and 12.

FIG. 13a shows in schematic side view of an autostereoscopic display apparatus similar to those described in WO-03/015424 comprising a switchable lenticular element. The autostereoscopic display apparatus comprises a backlight 120, a polarizer to 122, a quarter waveplate 124, (array) substrate 102, pixellated liquid crystal layer 128, (opposite) substrate 100, quarter waveplate 132, polarizer 134, substrate 136, switchable polarization rotating layer 138, substrate 140, birefringent microlens array 142 (comprising a lenticular screen), isotropic layer 144 and substrate 146. Such a 2D/3D display is capable of switching between an autostereoscopic 3D display and a full resolution 2D display with full brightness in 2D and 3D modes. Alternatively the switchable birefringent lens and polarization switching apparatus may be replaced by a fixed lens so that the display is a non-switching 3D autostereoscopic display.

Figure 13B:
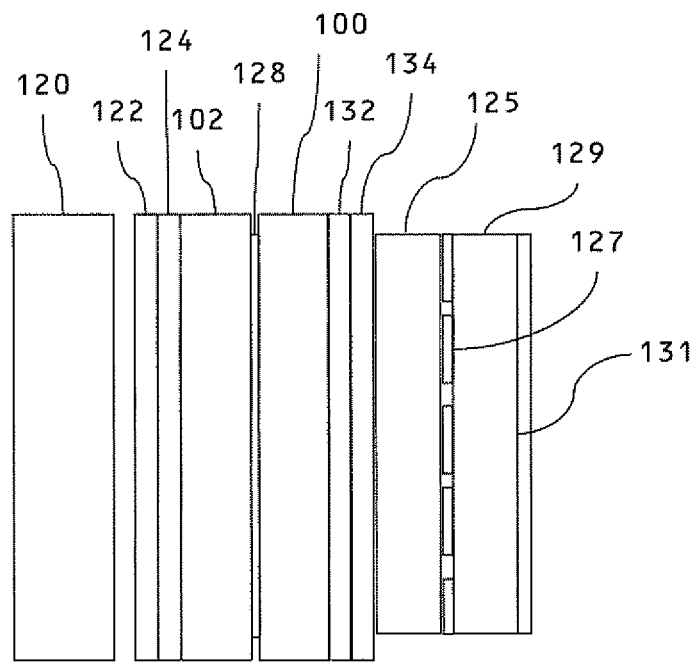
FIG. 13b shows in cross section a switchable parallax barrier autostereoscopic display using a spatial light modulator of FIGS. 11 and 12.

FIG. 13b shows a parallax barrier autostereoscopic display apparatus. A parallax barrier is an alternative form of parallax element to a lenticular screen that directs light into different viewing windows. The switchable lenticular screen of FIG. 13a is replaced by a liquid crystal parallax barrier element comprising substrates 125, 129; patterned liquid crystal layer 127 and output polarizer 131. The parallax barrier operates in a similar way to a lenticular screen with the pixel arrangements of the present invention, although has lower throughput efficiency. Alternatively, the parallax barrier may be a fixed barrier. The geometric axis of the parallax barrier is again parallel to the optical axis of the optical elements that are the apertures in the parallax barrier.

Figure 14:
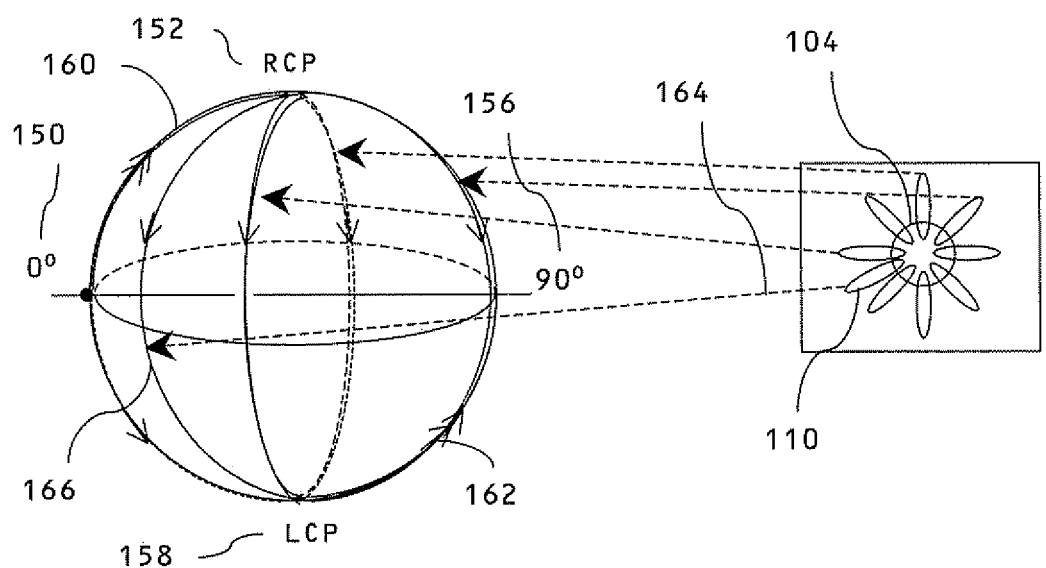
FIG. 14 shows a Poincare sphere interpretation of polarization modulation in a radially symmetric mode spatial light modulator.

FIG. 14 shows the operation of the pixel of FIGS. 11 and 12. Incident light from backlight 120 is polarised by polarizer 122 to provide incident polarization state 150 (for example 0 degrees) and is converted to right circular polarization state 152 by the quarter waveplate 124. Each orientation of the liquid crystal molecules then provides a half waveplate function so that in the unswitched state the light is converted to left circular polarization state 158. For example a liquid crystal molecule 110 indicated by the line 164 provides a rotation about an axis so that the transition 166 is provided on the Poincare sphere. Each orientation provides a transition 160, 162 or 166 at a different orientation. Following the quarter waveplate 132 provides transition 162 to provide an output polarization state 156 which is transmitted or absorbed by the output polarizer 134. In the opposite drive state, the molecules are aligned so as to provide substantially no phase modulation so that the polarization state at the input to the polarizer 134 is substantially parallel to the input polarization state 150.

Advantageously such an arrangement provides enhanced angular contrast properties of the display (wide viewing angle) compared to twisted nematic modes of operation.

Figure 15A:
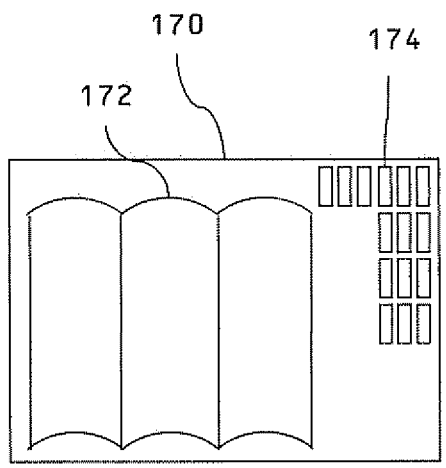
FIG. 15a shows an arrangement of lenticular screen and pixel array.
Figure 15B:
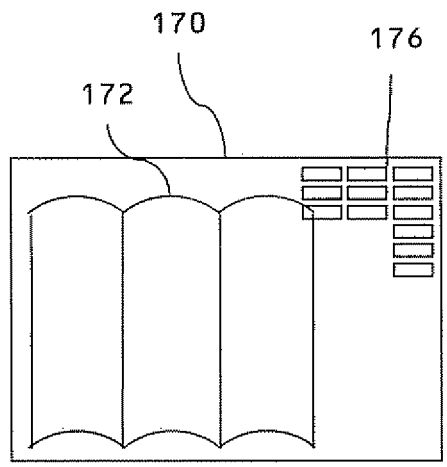
FIG. 15b shows a further arrangement of lenticular screen and pixel array.
Figure 15C:
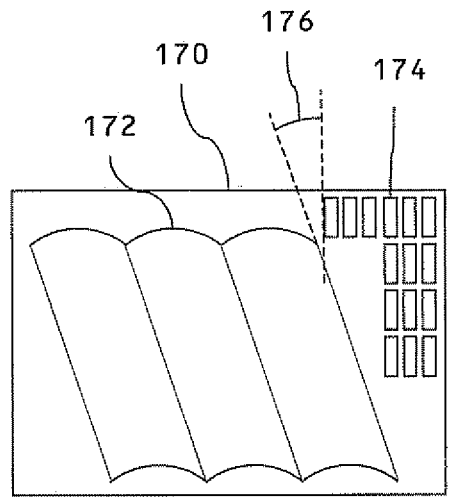
FIG. 15c shows a further arrangement of lenticular screen and pixel array.
Figure 15D:
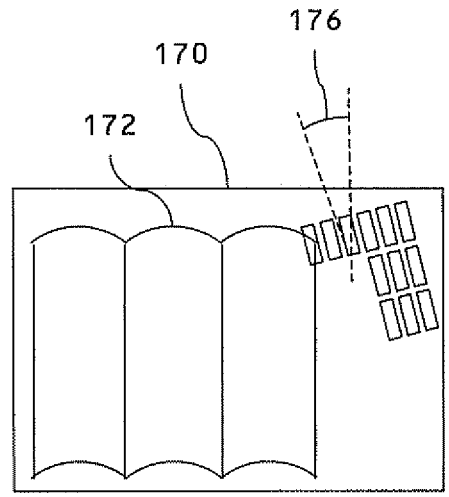
FIG. 15d shows a further arrangement of lenticular screen and pixel array.

FIG. 15a shows a first arrangement of a display pixel plane 170 with a lenticular screen 172. Pixels are arranged in an array 174 with columns and rows with the rows substantially parallel and perpendicular to the geometric axis of the lenticular lens elements. The pixels have a portrait pixel aperture orientation. In FIG. 15b, the pixel array 176 has pixels with a landscape orientation. In FIG. 15c, the lenticular screen 172 is inclined at a non-zero angle 176 with respect to the arrangement direction (vertical) of the rows of pixels of the array 174. In FIG. 15d, the lenticular screen 172 is vertical but inclined at a non-zero angle 176 with respect to the arrangement direction of the rows of the pixels of the array 174. The arrangement of FIG. 15d advantageously produces vertical viewing windows so that the optimum viewing position does not appear to change as the viewer moves vertically with respect to the display. In these examples, the rows and columns of pixels are perpendicular, although in the general case this is not essential and the row direction and column direction may be arranged at an angle of less than 90 degrees.

Figure 16A:
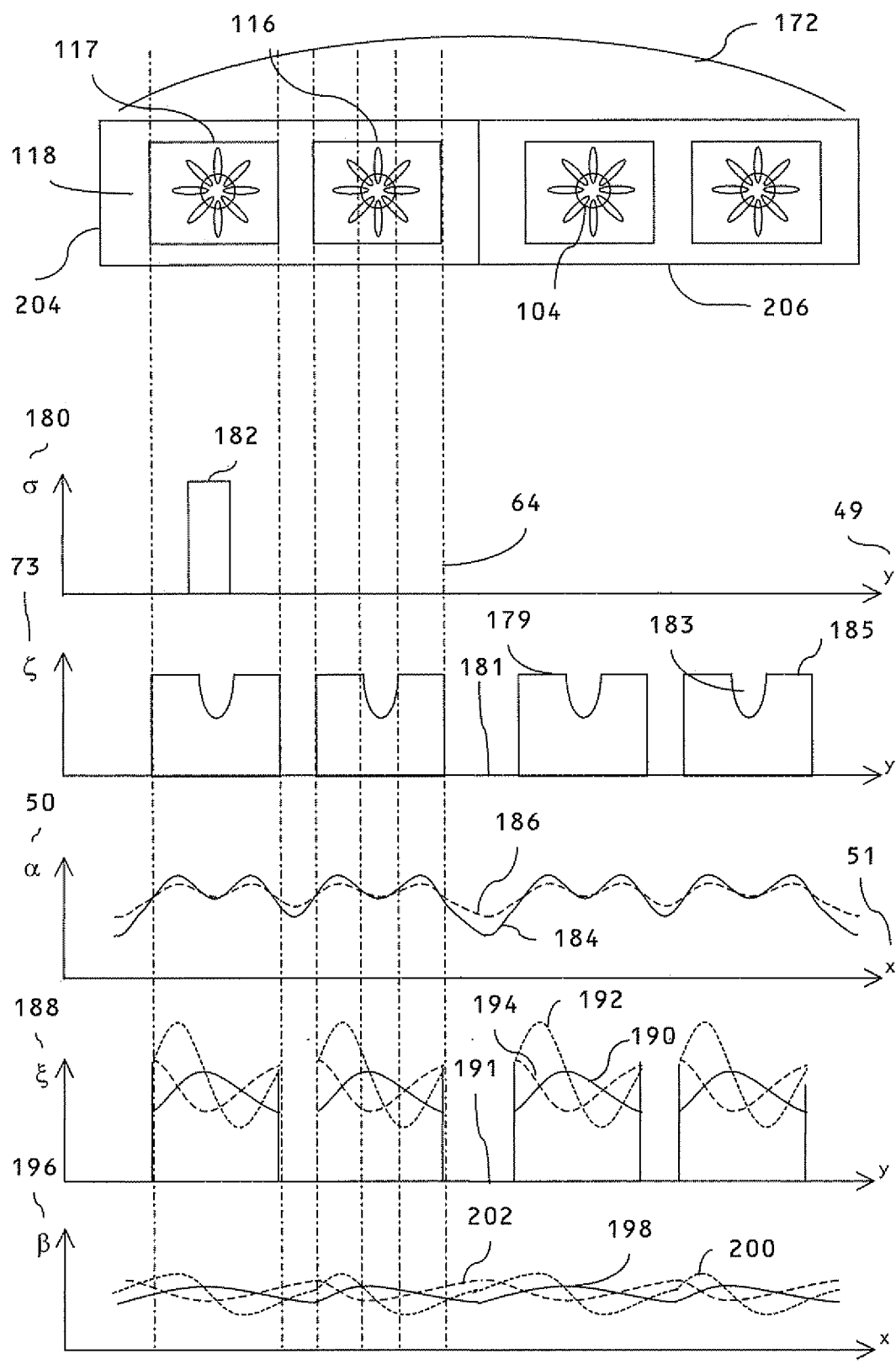
FIG. 16a shows the AIU and ACU properties of a prior art landscape pixel autostereoscopic display.

FIG. 16a shows the landscape pixel arrangement of FIG. 15b when combined with an array of pixels 118 of FIG. 12. Two columns of pixels are placed under each lens of the lens array to provide a two view autostereoscopic display with vertical lenses. The lenticular screen 172 has vertical notional line (ray lines 64) parallel to the geometric lens axis. Light from the spatial light modulator is collected from a given ray line 64 and directed in a particular direction. The light received by a viewers eye may be analyzed by considering an intensity (or luminance) profile or 'spot size' sigma (σ) function 182 representing the image of a notional observer's pupil at the pixel plane produced by the lenticular screen 172, sigma (σ) 180 against position at the pixel plane, y 49. The viewer's eye receives light collected from this image.

The zeta (ζ) function 185 representing the distribution of the overlaps of the notional ray lines 64 with the apertures 116, 117 is shown. In particular this has troughs 181, of zero zeta (ζ) peaks 179 of maximum zeta (ζ) and dips 183 representing the zeta (ζ) function at the bump feature 104 regions.

Figure 1:
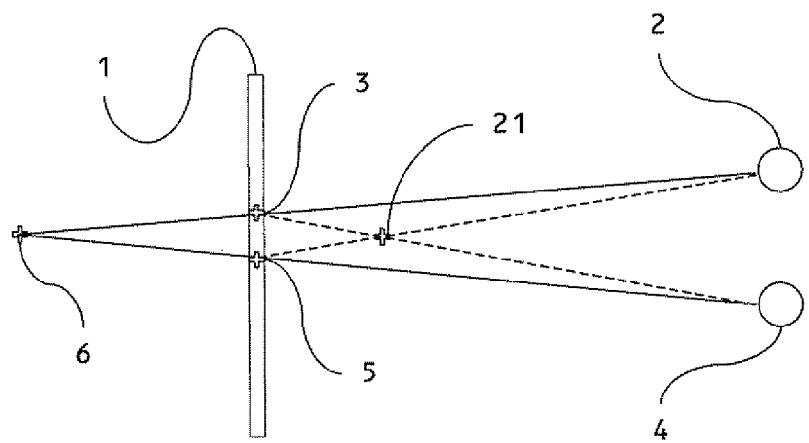
FIG. 1 shows the generation of apparent depth in a 3D display for an object behind the screen plane.
Figure 2:
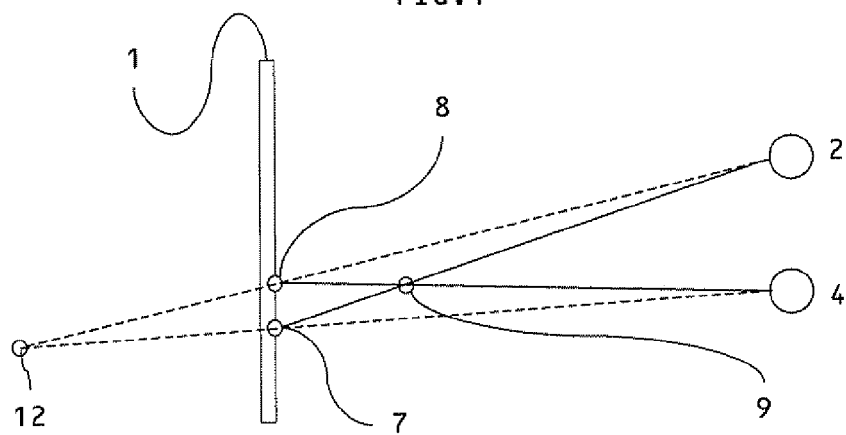
FIG. 2 shows the generation of apparent depth in a 3D display for an object in front of the screen plane.
Figure 3:
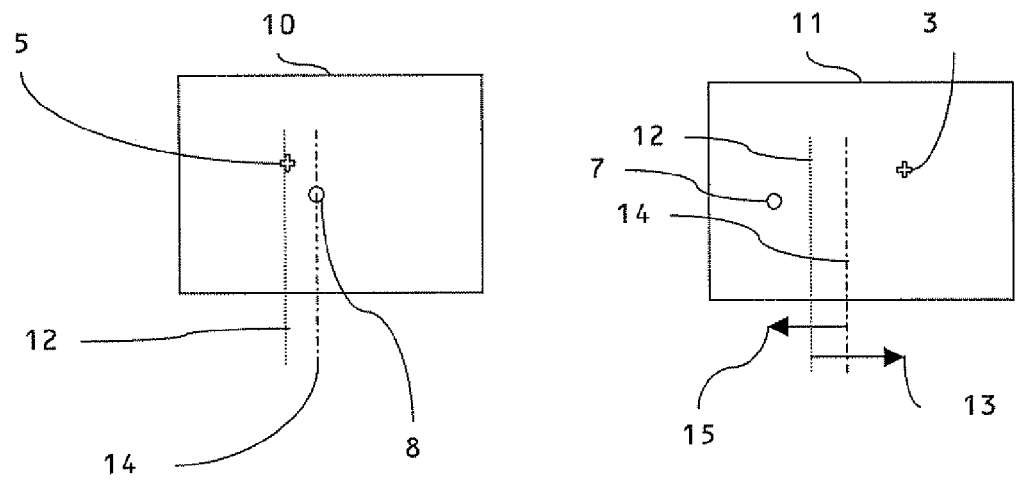
FIG. 3 shows the position of the corresponding homologous points on each image of a stereo pair of images.
Figure 4:
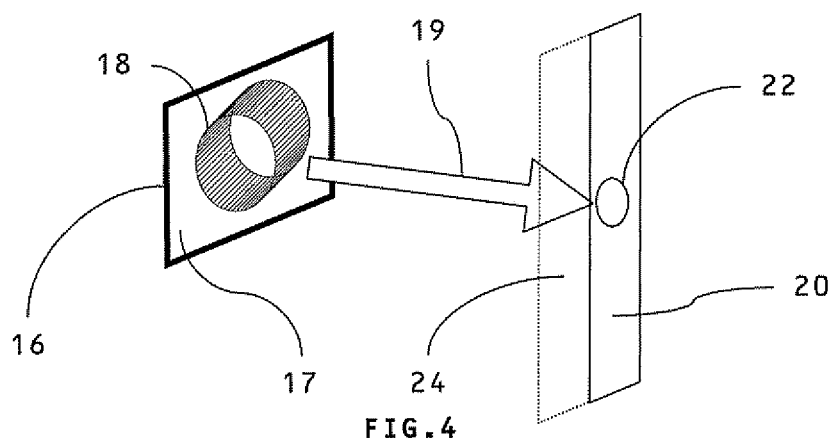
FIG. 4 shows schematically the formation of the right eye viewing window in front of an autostereoscopic 3D display.
Figure 5:
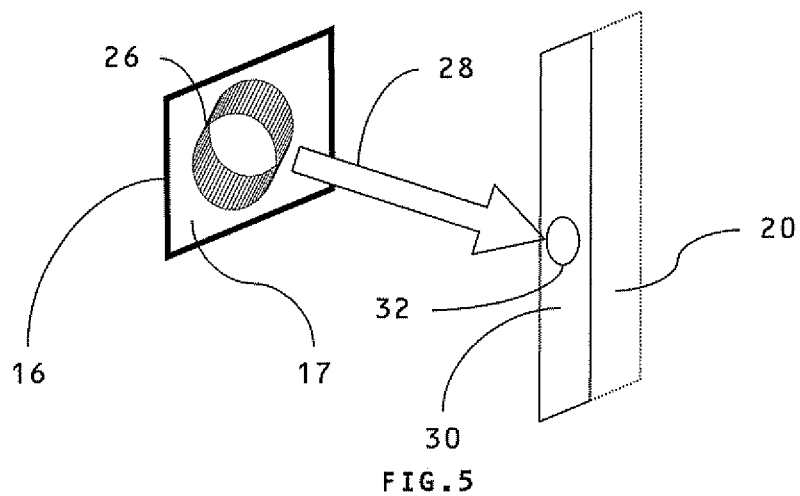
FIG. 5 shows schematically the formation of the left eye viewing window in front of an autostereoscopic 3D display.
Figure 6:
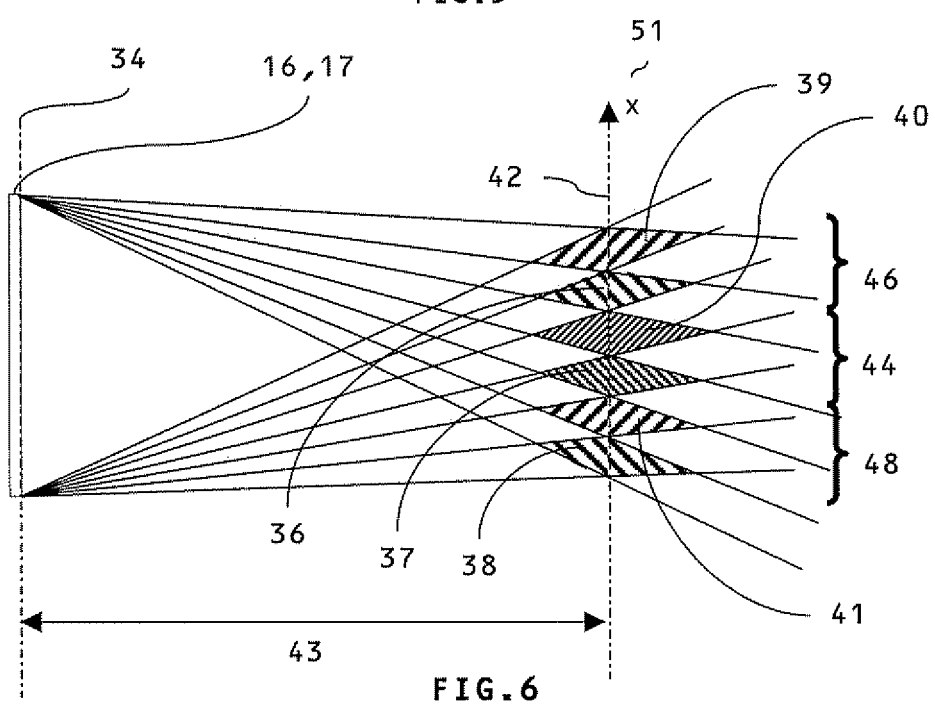
FIG. 6 shows in plan view the generation of viewing zones from the output cones of a 3D display.
Figure 7:
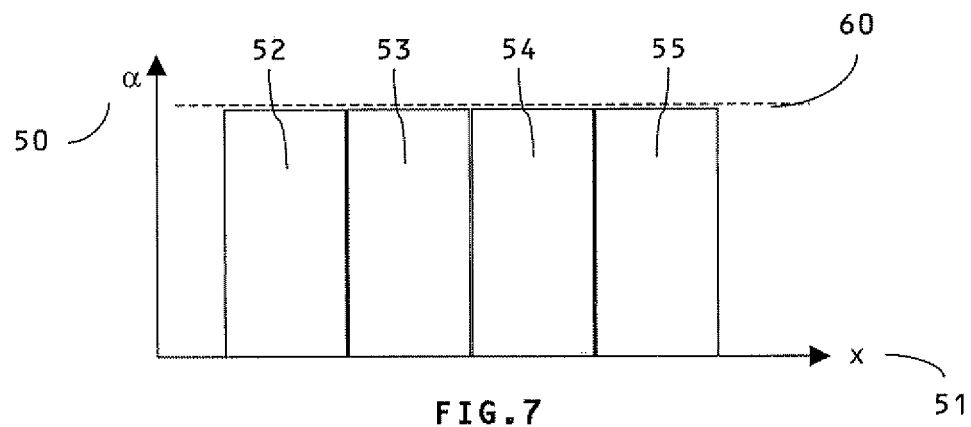
FIG. 7 shows one window profile for an autostereoscopic display.
Figure 8:
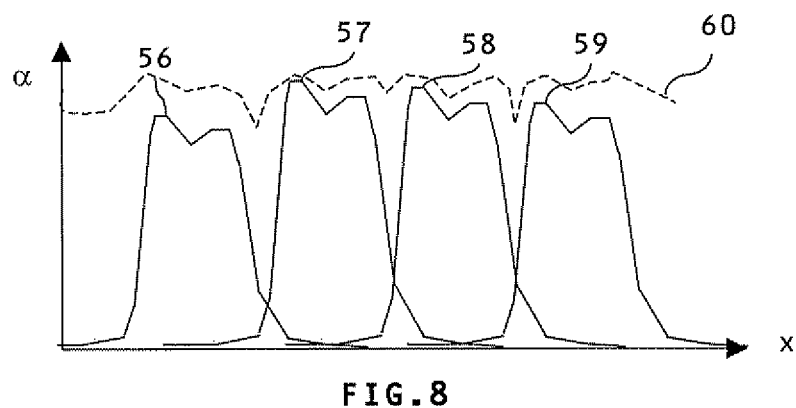
FIG. 8 shows a schematic of the output profile of viewing windows from an autostereoscopic 3D display.

When the pixels 118 are imaged by the lenticular screen 172 to the viewing window plane, for example as shown in FIG. 6, the variation of intensity (alpha (α)) 50 against position x 51 at the viewing window plane is given by the function 184 as shown, being the convolution of the sigma (σ) function 182 with the zeta (ζ) function 185. This AIU variation means that the intensity varies as the eye moves across the window plane. If the spot size sigma (σ) function 182 is increased, then the window may be blurred to have less AIU variation as shown by the alpha (α) function 186. However, such a blurring serves to increase the crosstalk characteristics of the display, thus degrading the 3D image quality.

This analysis can be further extended to evaluate the angular contrast uniformity (ACU). The contrast xi (ξ) 188 is shown schematically against position y 49 across the pixel plane. It can be seen that for a single aperture 117 or 116 there are various different contrast xi (ξ) functions 190, 192, 194 across the aperture 117 or 116. In regions 191, the xi (ξ) 188 is zero so the contrast is indeterminate and marked as zero. Each xi (ξ) function 190, 192, 194 represents a different polar coordinate of viewing the output of the display. Thus the contrast directly on-axis may be represented by one xi (ξ) function 194, while the contrast at polar coordinate viewing the display from 45 degrees off normal in the north-east direction may be represented is by a different function 192.

The convolution of the spot function sigma (σ) function 182 with the contrast xi (ξ) functions 190, 192, 194 together with the collection cone angle of the lenticular screen provides the angular contrast beta (β) 196 against window position x 51. It can be seen that each viewing angle has a different contrast beta (β) functions 198, 200, 202, each corresponding to contrast variation as the eye moves across the window plane, the contrast variation being different for different viewing angles. Thus the angular contrast uniformity ACU is not uniform across the output of the display.

Angular contrast uniformity, ACU can manifest itself as intensity changes in black states of the display, and can thus result in flicker effects in the black states of the display as the observer moves. Further such an effect can be manifested as color changes across the window plane due to the variation of chromaticity of the liquid crystal half-wave plate effect for any particular liquid crystal molecule tilt.

Such effects will vary with polar viewing angle. For ease of explanation, the variation from a single polar observation coordinate will be described in further ACU functions (xi (ξ) against y and beta (β) against x) in this specification.

Figure 16B:
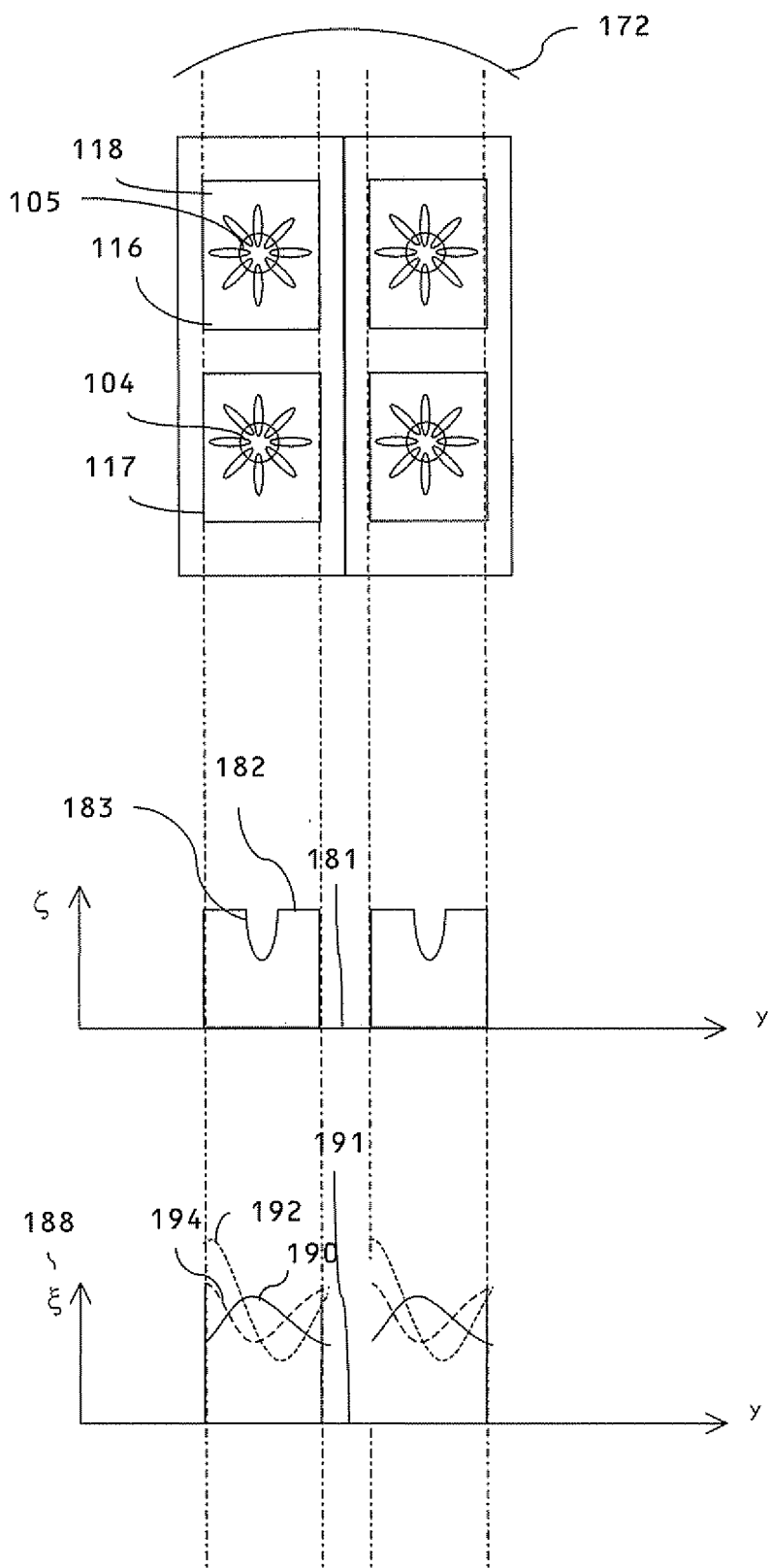
FIG. 16b shows the AIU and ACU properties of a prior art portrait pixel autostereoscopic display.

FIG. 16b shows the arrangement of portrait pixels of FIG. 12 with a lenticular screen. In this case, both bump features 104, 105 are aligned so that there is a single contrast variation per viewing window rather than the double contrast variation as shown in FIG. 16a.

Embodiments

Figure 17:
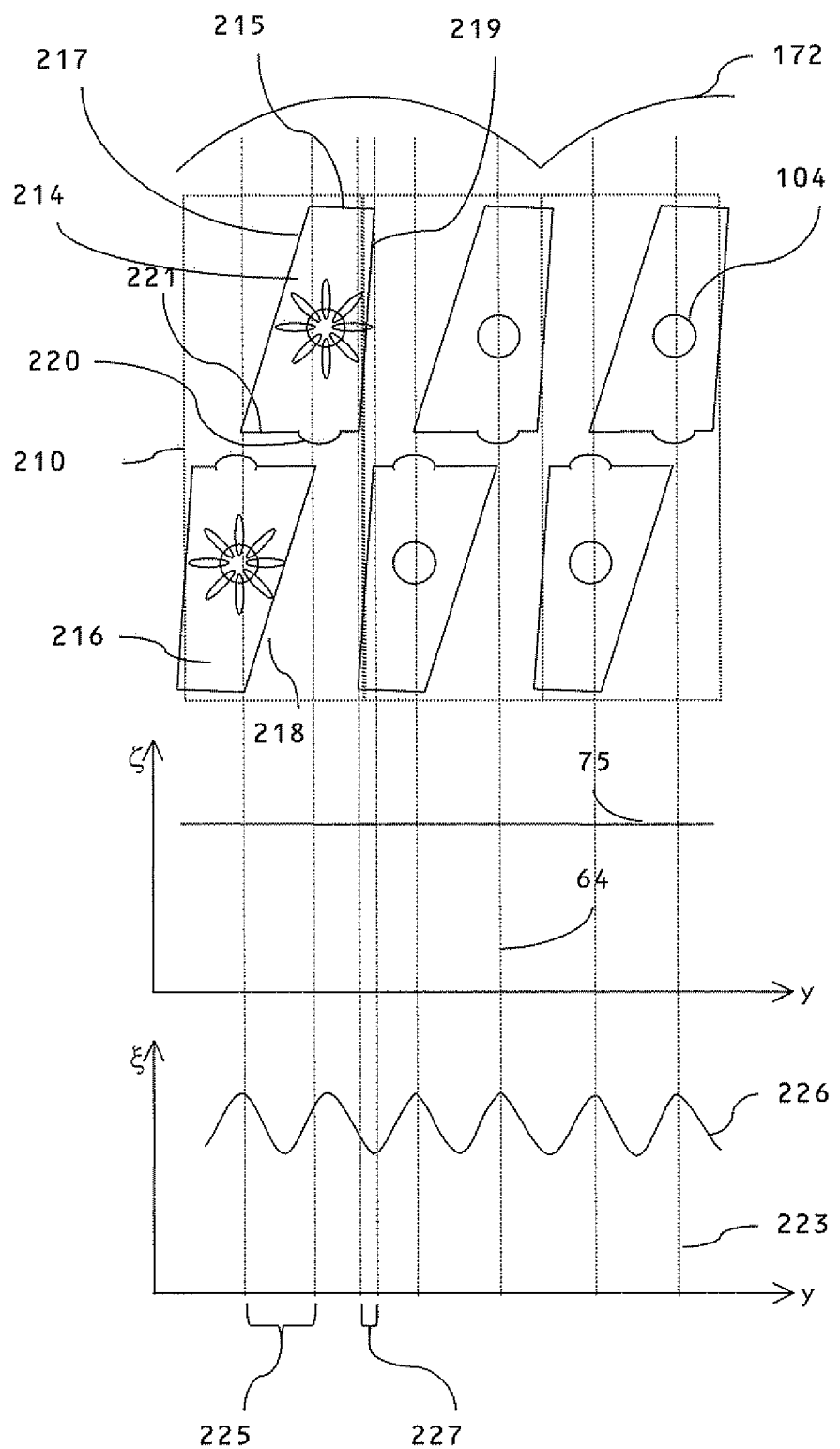
FIG. 17 shows a pixel arrangement embodiment of the present invention.

FIG. 17 shows a first embodiment of the present invention. Radially symmetric mode portrait pixel 210 comprises a top aperture (or so-called top or first displaying area) 214 and bottom aperture (or so-called bottom or second displaying area) 216, each containing a bump feature 104 arranged as described above to provide radially symmetric alignment of the molecules of liquid crystal. FIG. 17 shows three pixels 210 of different colors, for example red, green and blue. The apertures 214 and 216 of the pixels 210 are separated by regions 218 containing electrodes, capacitors and other addressing circuitry. As described in further detail below, each pixel 210 is individually addressable, that is each pixel is addressable separately from each other. The top aperture 214 and bottom aperture 216 of each pixel 210 may be addressable unitarily or may be addressable separately.

The apertures 214 and 216 are shaped in a particular manner having regard to the bump feature 104 to improve AIU and ACU. Aperture 214 has a horizontal top edge 215, inclined edges 217, 219 and a bottom edge 221 with bump feature compensation feature 220. The bottom edge 221 and the bump feature compensation feature 220 are integrated. The lower aperture 216 has the same aperture shape, rotated through 180 degrees. In this example, the bump feature compensation feature 220 is aligned with the bump feature 104 parallel to (with respect to) the ray lines 64 and has an aperture shape arranged to compensate for the loss in the bump feature region 104 as will be described with reference to FIGS. 19-22.

The edges 217 of the apertures 214 and 216 of a single pixel 210 overlap in overlap region 225 and the edges 219 of the apertures 214 and 216 of two adjacent pixels 210 overlap in overlap region 227. Ignoring the bump feature compensation feature 220, the top edge 215 and bottom edge 221 are parallel so that the apertures 214 and 216 outside the overlap regions 225 and 227 have the same height parallel to the ray lines 64. In this example, areas of the apertures 214 and 216 inside the overlap regions 225 are substantially the same and/or substantially align with respect to the ray lines 64. Similarly, in the overlap regions 225, 227, the edges 217 are parallel to each other and each inclined with respect to the ray lines 64, and the edges 219 are also parallel to each other and each inclined with respect to the ray lines 64.

As a result, ignoring the bump feature compensation feature 220, the total length of intersection of a ray line 64 with the pixels 210 in a single row is the same for each position of the ray line 64 (being a notional line). Outside the overlap regions 225 and 227, the intersection is with a single one of the apertures 214 and 216 and the length of intersection is the distance between edges 215 and 221. In the overlap region 225, this length of intersection is summed over two apertures 214 and 216 of the same pixel 210. In the overlap region 227, this length of intersection is summed over two apertures 214 and 216 of different pixels 210 that are different colors. Considering pixels 210 of a single color, the total length of intersection of a ray line 64 with the pixels 210 of the same color that are adjacent along the ray line 64 is the same for each position of the ray line 64 (being a notional line). For positions outside the overlap regions 225 and 227 and positions in overlap region 225, the ray line 64 has a constant length of intersection with a pixel 210 in a single row shown in FIG. 17. This accounts to the greatest range of positions of the ray line 64. However, for positions in overlap region 227, the length of intersection with a single pixel 210 of a single color in a single row is less, and reduces as the ray line 64 moves outwardly. However, in subsequent rows, the colors of the pixels 210 are offset. This has the result that in the overlap region 225 the intersection with the pixel 210 in the row shown in FIG. 17 sums with the intersection with a pixel 210 of the same color in another row that is adjacent along the ray line 64, so that the total length of intersection with pixels 210 of that color remains the same.

Thus ignoring the bump feature 104 and bump feature compensation feature 220, the shape of the apertures 214 and 216 provides a uniform zeta ($\zeta$) function (intensity function) 75 for all positions y 49 of the ray lines 64.

The bump feature compensation feature 220 is arranged to compensate for the is bump features 104, providing a uniform zeta ($\zeta$) function 75 even taking into account the bump features 104. As described further below with reference to FIGS. 19 to 22, this is achieved by the bump feature compensation feature 220 being shaped such that the total length of intersection of a ray line 64 with the pixels 210 of a given color, weighted for the intensity at the bump feature 104, is the same for each position of the notional ray line 64.

The shape of the apertures 214 and 216 including bump feature compensation features 220 has several important benefits. Advantageously, the AIU of the display is constant independent of the spot sigma ($\sigma$) function 182. Typically the spot sigma ($\sigma$) function 182 varies with angle due to the aberrations of the lens so that the alpha ($\alpha$) function 186 and thus the AIU varies with viewing angle. However, the current embodiments mean that the change in spot sigma ($\sigma$) function 182 with viewing angle is not visible as the observer changes viewing position. Such a display shows reduced flicker to an observer moving with respect to the display.

Further, the tolerance on manufacture of the optical elements can be relaxed so that the optical elements are cheaper to manufacture. Further the 2D mode performance can be enhanced because errors in the component performance (such as scatter or refractive index mismatch) are not visible as 2D AIU errors.

Further, the spot size of the optical elements can be reduced so that the level of cross talk between adjacent views can be reduced, thus increasing 3D image quality. Further, the amount of blur between adjacent images can be reduced in multi-view displays so that the amount of depth that can be shown increases.

Further, the window size of a two view display can be increased so that wider viewing windows can be used. For example, such an arrangement enables nominal window sizes at the viewing window plane of 130 mm rather than 65 mm. The small overlap between the adjacent pixel columns means that the region of cross talk between the views is minimized compared to the prior art. Thus the observer can have a wide region in which an orthoscopic image can be seen. If the observer moves laterally, a 2D image is seen (as both eyes are in the same viewing window) before a pseudoscopic image is seen. Such a display has an extended longitudinal viewing freedom.

It can further be seen that the position of the bump features 104 in the two apertures 214 and 216 of a pixel 210, and hence the bump feature compensation features 220, are offset in the direction perpendicular to the ray lines 64, rather than being vertically aligned as in a 2 view display using portrait pixels 118 of the form shown in FIG. 12. Thus the ray lines 223 through the centre of the regions of the bump features 104 can be seen to be distributed across the pixel width. The spacing of the ray lines 223 may be equal. In this manner, the bump feature 104 provide compensation for ACU effects in the display providing a more uniform ACU function 226 than otherwise possible. As the bump features 104 provide radially symmetric alignment of the molecules of the liquid crystal, in general terms ray lines 64 at different positions cross molecules of the liquid crystal that are aligned differently, depending on the position of the ray line 64 with respect to the bump features 104. The different alignment causes variation in the contrast of the light collected from the different notional lines and observed by a viewer at a corresponding viewing position, hence generating ACU. The ACU is poor in the pixel arrangement shown in FIG. 16a, but this effect is reduced by the bump features 104 being offset in the pixel 210. This is because, across the range of possible positions of the notional lines, there is a reduction in the overall variation in the alignment of molecules of liquid crystal that causes variation in contrast.

Thus embodiments provide enhanced AIU and enhanced ACU in radially symmetric mode displays. Such displays show low levels of flicker as the observer moves and show increased tolerance to manufacturing errors of optical components and are thus of lower cost.

Advantageously, the embodiments provide a uniform variation of intensity with viewing angle of the autostereoscopic display. Such embodiments remove residual visibility of the black mask between the domains of the display. An observer looking at the display sees a uniform intensity structure across the display for a wide range of viewing angles. Thus, the display does not appear to flicker as the observer moves with respect to the display. Such flicker is a disturbing visual artefact. Further, the cost of the pixel arrangement is substantially the same as the known pixel arrangements. Thus, the AIU of the display as represented by the function 60 is advantageously substantially constant for all angles of viewing of the display, regardless of the focal condition of the parallax element. Such an arrangement advantageously also provides high ACU. Thus, the variations of contrast or color of the display are minimized as the observer moves their head. If the contrast were to change as the observer moves, then the images would also appear to flicker in intensity or color, degrading display performance.

In switchable 2D/3D displays, there may also be some residual 3D function when the display is switched to 2D. Advantageously, in the present embodiments, the AIU and ACU are independent of the focal condition of the parallax optic. Thus, if there is some residual 3D function in the 2D mode, advantageously it will not be manifested as AIU or ACU effects in the present embodiments. This enables the manufacturing tolerances of the optical elements to be relaxed. For example, in switchable birefringent lenses, as described for example in U.S. Pat. No. 7,058,252, there may be some residual refractive index step between a liquid crystal and isotropic lens material. In conventional pixels, this may cause an AIU error due to the residual lens function. In the present embodiments, the tolerance on index step can thus be relaxed, advantageously reducing lens cost and increasing yield and a wider choice of materials and wider processing latitude.

In the present embodiments, the actual alignment of the individual domains can be adjusted to optimize aperture ratio while providing sufficient room for electrodes and addressing circuitry. The figures are provided for illustrative purposes, but could be adjusted.

Further, in the 3D mode, the focus of the lens can be optimized, rather than defocussed as reported in prior art systems. Advantageously this results in an increased separation of view data across adjacent viewing windows. Reducing window overlap advantageously reduces the blur seen in 3D images so that the total amount of depth that can be shown is increased. Further, the pseudoscopic image intensity can be reduced, increasing display comfort. Such an arrangement can be applied to 3D displays using parallax optics such as lenticular screens and parallax barriers.

Further in lenses which have a variation in optical function with viewing angle such as caused by off-axis aberrations or by changes in the effective lens index step with incident illumination angle, the region of light collected from the pixel plane will vary with viewing angle. In the present embodiments, advantageously, the ray line has a constant intersection length for all ray lines for pixels of the same color along the ray line which means that as the region from which ray lines are collected varies with viewing angle, the same intensity and contrast function will be produced. Such a pixel arrangement therefore enables high viewing angle without the generation of non-uniform intensity distributions giving good AIU and ACU properties.

Further, in passive birefringent lenses with performance dependent on the viewing angle of a polarization switcher, the intensity variation will be independent on the polarization output of the switcher. Such an arrangement enables the switcher to have reduced optical compensation films, and so is cheaper, thinner and easier to manufacture.

Further in active birefringent lenses which have a 3D function off-axis when the lens is arranged in the 2D mode, the black mask is not resolved as a change in AIU or ACU with viewing angle.

Thus the present embodiments have advantages of increased image quality combined with reduced cost without compromising the 2D performance of the display. Such an arrangement is achieved by modification of layout of pixel apertures.

Figure 18A:
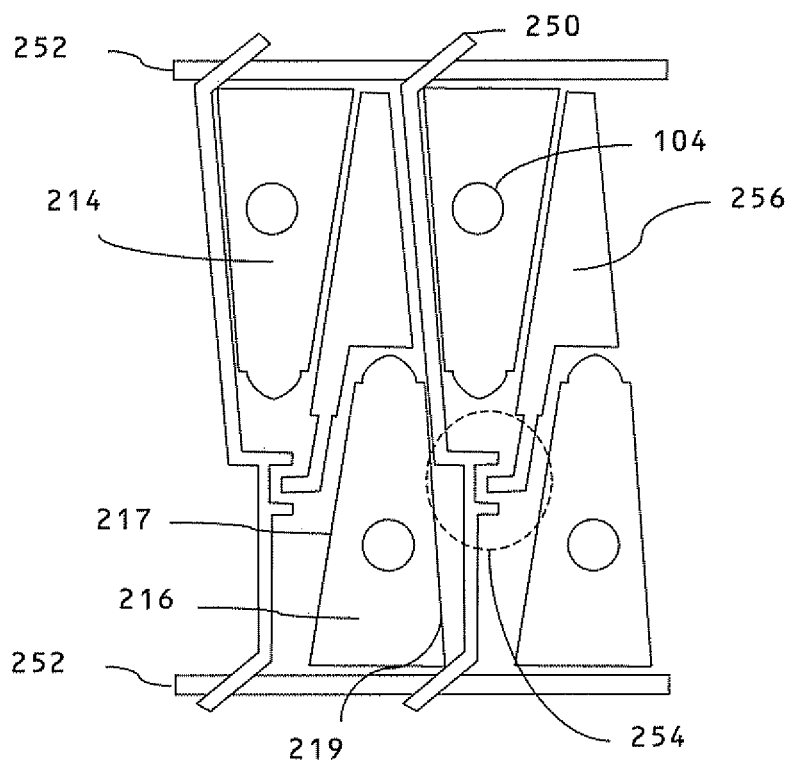
FIG. 18a shows a layout of circuitry for a pixel arrangement embodiment of the present invention.
Figure 18B:
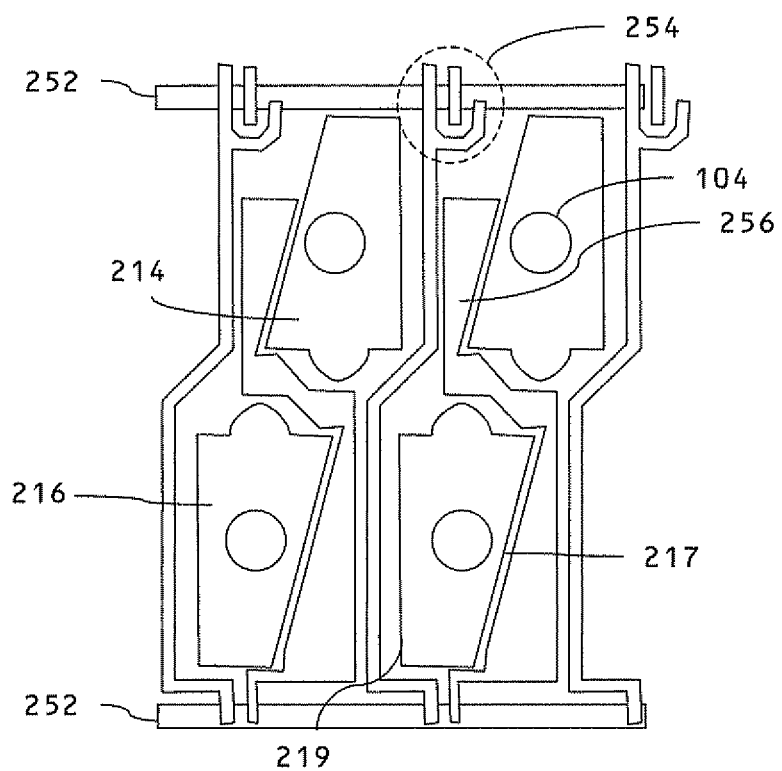
FIG. 18b shows a further layout of circuitry for a pixel arrangement embodiment of the present invention.

FIG. 18a shows one possible layout of the pixels 210 shown in FIG. 17 in which the edges 219 between the columns of pixels are sloped (inclined). Each pixel 210 is individually addressable as follows. Apertures (displaying areas) 214, 216 are driven by column electrodes 250, row electrodes 252, transistor elements 254 and electrode 256. A pixel region is formed with two adjacent row electrodes 252, two adjacent column electrodes 250. The electrode 256 is in the pixel region. Electrodes 256 and the opposite electrode (not shown) of the opposite substrate may form a capacitor for keeping an electric field to the liquid crystal layer located therebetween. As shown in FIGS. 18a and 18b, two apertures 214 and 216 are in the pixel region. However, it is not limited herein. There may be only one or more than two apertures in a single pixel region. In this manner, the addressing circuitry can conveniently be positioned between the respective pixel apertures while retaining the pixel aperture functions. Further, some vertical overlap of pixels is possible so that the aperture ratio of the system can be optimized FIG. 18b shows a further possible layout of the pixels shown in FIG. 17 in which the edges 219 between the columns of pixels are vertical, so aligned substantially parallel with the geometric axes of the parallax optical element. This arrangement has a lower aperture ratio but advantageously has a lower cross talk region between the views compared to FIG. 18a.

Detail of the bump feature compensation features will now be described by illustrative embodiments. The bump features 104 when analyzed by quarter waveplates and polarizers comprise regions of lower intensity than the surrounding pixel. Thus, the intensity of the ray line overlap must be considered in addition to its length. The intensity of the bump feature 104 needs to be included to provide a uniform zeta ($\zeta$) 73 for a particular position y 49 in the pixel plane. Thus, the pixel apertures 214, 216 are shaped so that the length of intersection that is equalized for different positions of the ray line 64 is a weighted length of intersection. That is, across the bump feature 104, the length of intersection is weighted for the intensity of the light modulated by the bump feature 104 as a fraction of the intensity of light modulated by the remainder of the pixel 210, i.e. the remainder of the pixel other than the bump feature 104.

Figure 19:
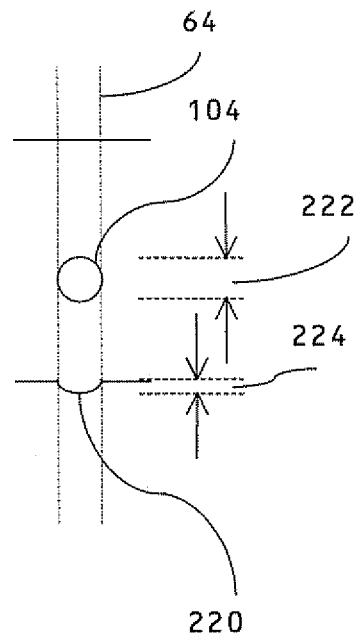
FIG. 19 shows a detail of a pixel arrangement embodiment of the present invention.

By way of example, FIG. 19 shows a case in which the intensity of the output in the region of the bump feature 104 is uniform and 50% of the intensity of the output in the remainder of the pixel 210. In order to maintain the ray line 64 overlap, along the ray lines 64, the length 224 of the bump feature compensation feature 220 (in a direction parallel to the ray lines 64) is smaller than that of the length 222 of the bump feature 104 (in a direction parallel to the ray lines 64), for example, a half of the length 222 of the bump feature 104. As the intensity in the bump feature compensation feature 220 is twice that of the bump feature region 104, then the total ray line intensity is constant across the width of the pixel.

Figure 20:
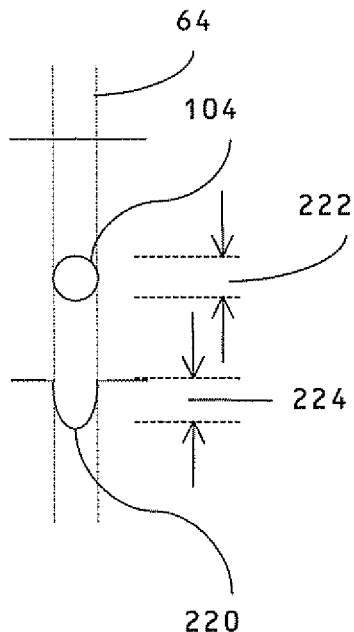
FIG. 20 shows a detail of a pixel arrangement embodiment of the present invention.

FIG. 20 shows a case in which the bump feature 104 has zero transmission. In this case, the tab length 224 is the same as the length 222 of the bump feature 104.

In other embodiments, the intensity function may vary across the length/width of the bump feature 104. In this case, the length 224 of the bump feature compensation feature 220 in a direction parallel to the ray lines 64 is set, at each position of the ray line 64, on the basis of the integral of the intensity function over the bump feature 104 at the respective position of the ray line 64 for compensating the light which is blocked by the bump feature 104. This has the result that the weighted length of intersection with the ray line 64, and hence the zeta ($\zeta$) function, are substantially constant at each position of the ray line 64.

Figure 21:
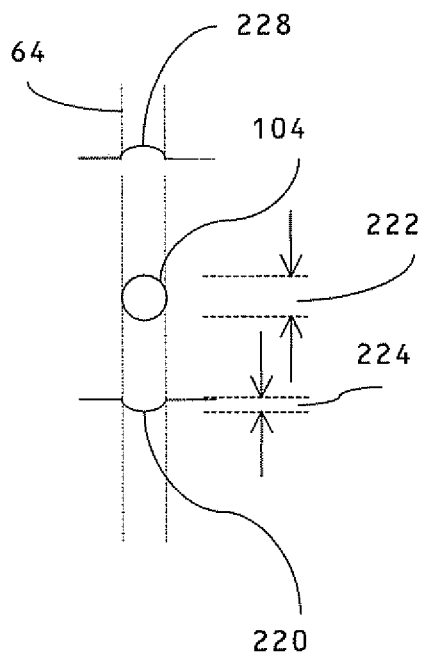
FIG. 21 shows a detail of a pixel arrangement embodiment of the present invention.
Figure 22:
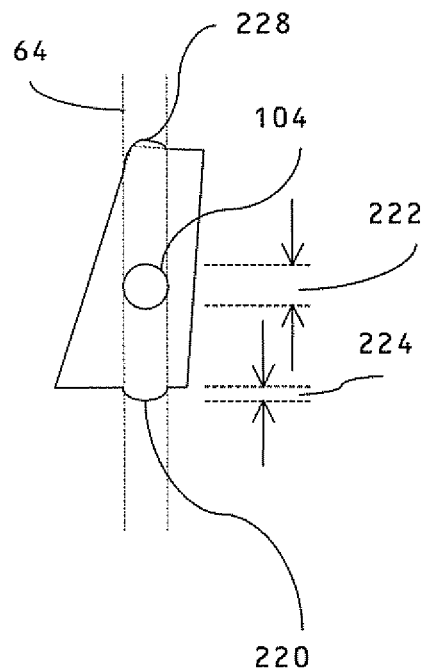
FIG. 22 shows a detail of a pixel arrangement embodiment of the present invention.

In FIG. 21, the bump feature compensation features 228 and 220 are shown as distributed at the top and bottom of the aperture 214. Advantageously, such an arrangement may provide for a different arrangement of addressing electronics, increasing the overall aperture ratio. In FIG. 22, the bump feature compensation feature 228 is combined with the shape of the inclined edge. That is to say, the inclined edge is connected with the edge of the bump feature compensation feature 228 as shown in FIG. 22.

It is further the purpose of embodiments to provide enhanced ACU properties by providing a spatial frequency of bump features and bump feature compensation features across the pixel width greater than the pixel spatial frequency when added across adjacent rows. In this manner, variations in ACU of a display can be minimized.

Of course the pixels may provide this effect with shapes other than that shown in FIG. 17. Examples of other shapes will now be described. FIGS. 23 to 26 show various embodiments of landscape radially symmetric mode pixels with bump feature compensation features and more than one bump feature across a pixel width summed across at least two adjacent rows of pixels.

Figures 23, 24:
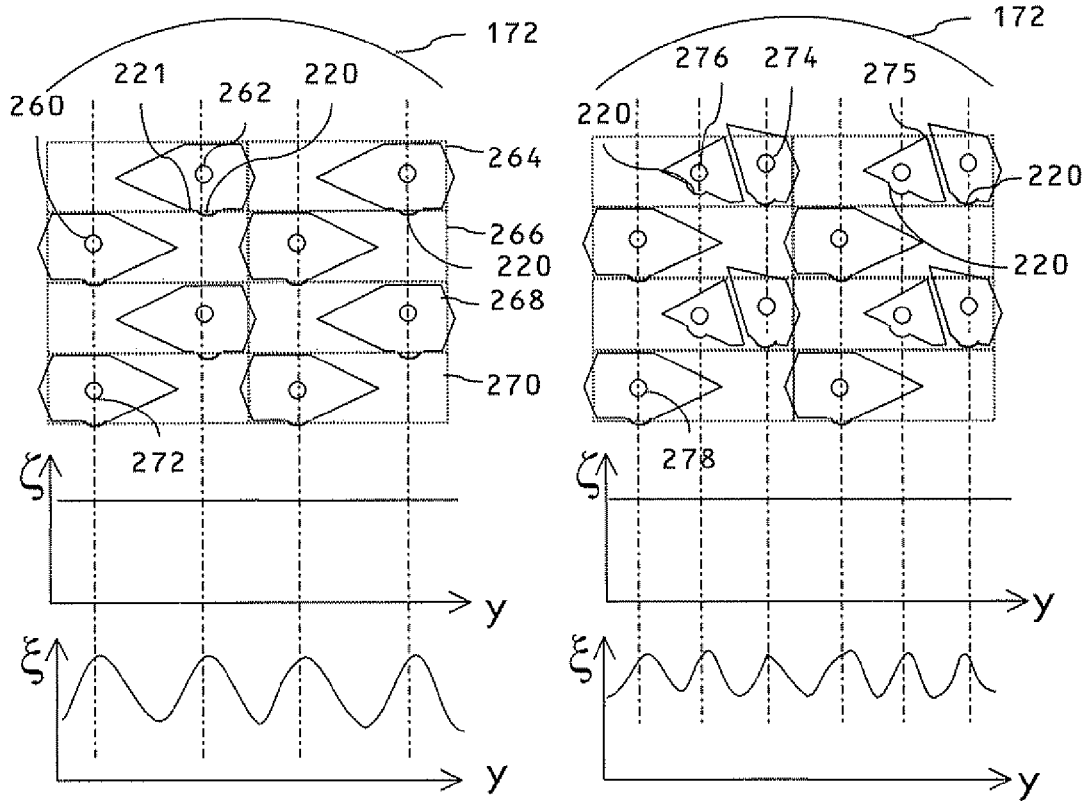
FIG. 23 shows a pixel arrangement embodiment of the present invention.
FIG. 24 shows a further pixel arrangement embodiment of the present invention.

FIG. 23 shows an example of four rows 264 to 270 of pixels, each comprising a single aperture having a bump feature compensation feature 220 and bump feature 260 and 262 over two adjacent rows of pixels. The adjacent rows may be pixels of different colors. For example, rows 264, 270 may be red pixels, row 266 may be green and row 268 may be blue. Considering pixels of a single color, the total length of intersection of a ray line 64 with the pixels of the same color that are adjacent along the ray line 64 is the same for each position of the ray line 64 (being a notional line). Considering the rows 264, 270 of red pixels, for some positions of the ray line 64, the ray line 64 intersects with a pixel in only one row 264 or in only the adjacent row 270, and at theses positions the pixels have a constant height so that the length of intersection is equal to that height. At other positions of the ray line 64, the pixels in the adjacent rows 264 and 270 overlap along the ray line 64 with correspondingly tapered shapes so that the total length of intersection summed over the pixels in the adjacent rows 264 and 270 substantially remains the same.

Thus, for pixel rows of the same color, bump features 262 and 272 are also laterally spaced to provide more than one bump feature compensation feature across a pixel width summed across at least two adjacent rows of pixels of the same color. The ACU improves, because the horizontally aligned liquid crystal directors in one row are aligned with vertically aligned liquid crystal directors in an adjacent row, thus averaging the respective contrast properties across the two rows. In the region of overlap between two pixel apertures along a vertical ray line, the edges of the pixel apertures may be inclined such that across any two rows of pixels, the length of intersection of a ray line may be constant for all positions of the ray line. In the centre of the pixel width (rather than aperture width), the inclination angle from the vertical may be greater than at the edge of the pixel width. This is because the overlap of the pixel apertures should be minimized in the region in which the view data changes in the viewing window plane; however in the centre of the pixel width, the higher inclination angle from the vertical may enable more convenient routing of row electrodes.

Figures 25, 26:
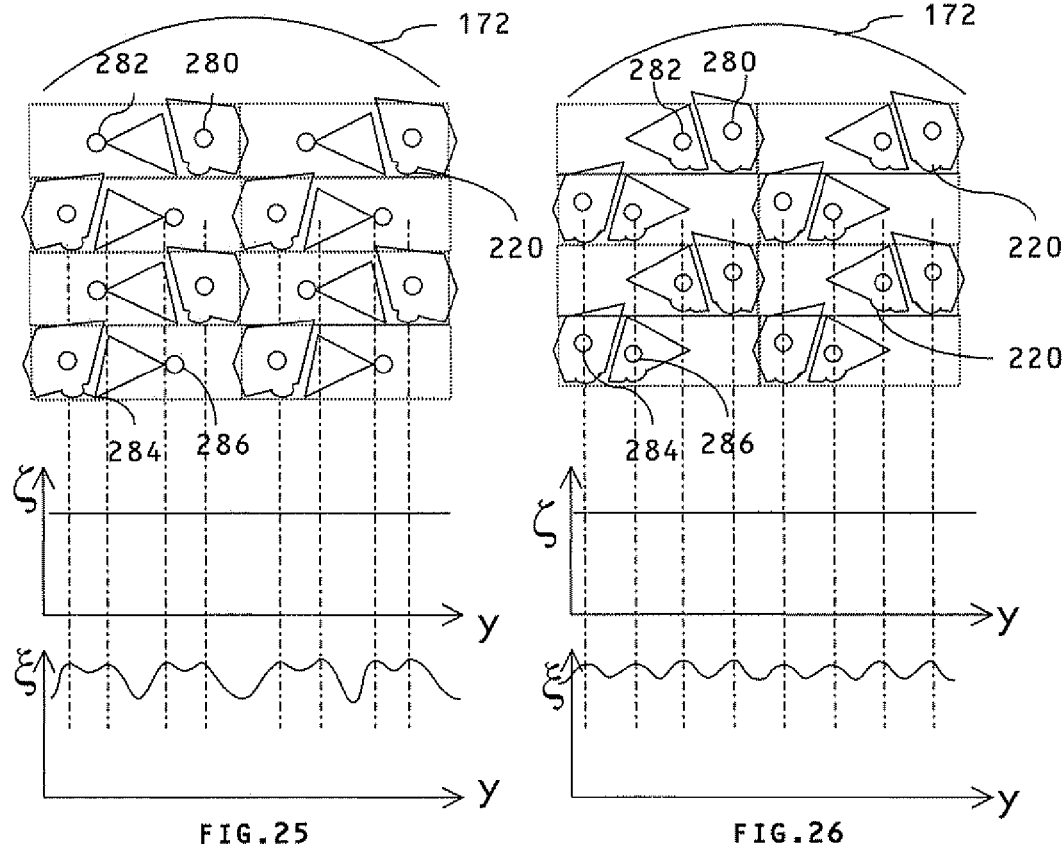
FIG. 25 shows a further pixel arrangement embodiment of the present invention.
FIG. 26 shows a further pixel arrangement embodiment of the present invention.

FIGS. 24 to 26 show examples similar to FIG. 23 but with the pixels split to comprise two apertures each containing a bump feature.

FIG. 24 similarly comprises three bump features 274, 276 and 278 laterally spaced across two rows of the same color. Liquid crystal disclinations are present in regions between the bump features 274, 276 so an additional masking area 275 is inserted to remove visibility of the disclinations. This further requires modification of the pixel boundaries in order to maintain the zeta ($\zeta$) function uniformity. In this example, the edges of the apertures are inclined with respect to the vertical which achieves a greater aperture ratio than for vertical edges in which the pixels are vertically offset as will be shown in FIG. 27. Increasing the number of bump features thus improves the ACU. Similarly FIGS. 25 and 26 show four bump features 280, 282, 284, 286 averaged across two adjacent rows of the same color. Varying the bump feature position may be extended over more than two rows. As shown in FIG. 25, the bump features 286 do not necessarily have to appear in the pixel aperture.

Figure 27:
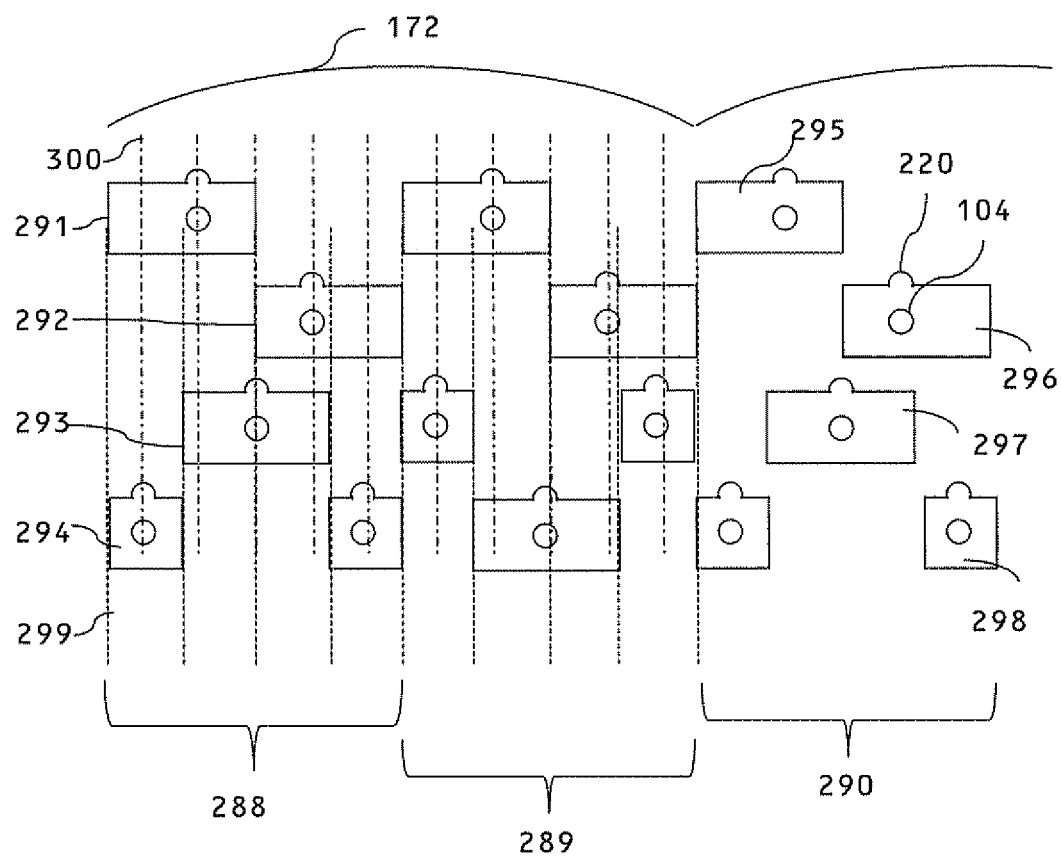
FIG. 27 shows a further pixel arrangement embodiment of the present invention.

FIG. 27 shows a further arrangement of pixel apertures and bump feature compensation features for use in a two view display with vertical lenses. Pixel columns 288, 289 are under a first lens of the lens array 172 while pixel column 290 is under the adjacent lens of the lens array 172. The pixels are arranged in a group of four rows 291, 292, 293, 294. Apertures 295, 296 and 297 have a width of half of the pixel pitch while aperture 298 has a width of quarter of the pixel pitch. The lateral position of the bump feature 104 in each of the apertures 295, 296 and 297 is different so as to provide a more uniform ACU as will be described. The length of the pixels in a direction parallel to the ray lines 64 is substantially constant other than in the bump feature 104 and bump feature compensation feature 220 for reasons explained previously. Alternatively, the pixel edges may be sloped and overlapping so that the zeta ($\zeta$) function is constant. Within the group of rows the total ray line 299 overlap at any position across the aperture is constant at two pixel aperture lengths in a direction parallel to the ray lines 64. Advantageously, this arrangement provides a regular sequence of bump features 104 as shown by the sequence of ray lines 300. Thus such an arrangement has a good ACU performance as well as good AIU performance in radially symmetric mode devices.

Figure 28:
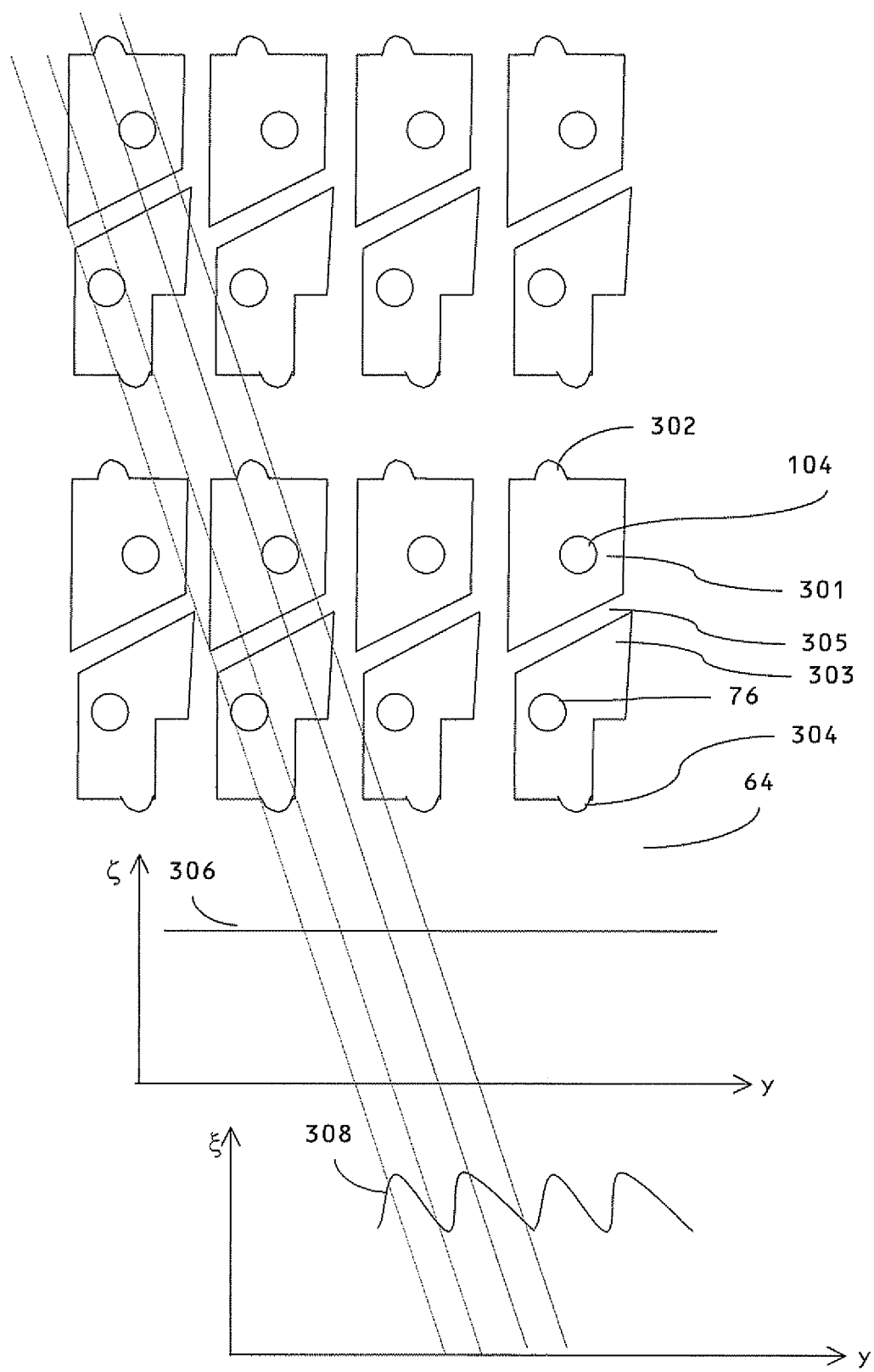
FIG. 28 shows a further pixel arrangement embodiment of the present invention.

The embodiments of the invention described hereinbefore comprise vertical lenses and vertical columns of pixels. However, the present invention can be applied to several different configurations including those shown in FIG. 15a to FIG. 15d for both lenticular screens and parallax barriers. FIG. 28 shows a further embodiment in which the lenses are tilted with respect to an array of substantially radially symmetric mode pixel apertures 301 and 303 in a manner similar to FIG. 15c. In this case, the bump feature compensation features 302, 304 are laterally offset with respect to the bump feature regions 305 along the ray line 64 parallel to the geometric lens axis. Further rectangular cutout sections are shown to improve AIU. The shape of the bump feature compensation features 302, 304 are modified from semi-circles shown previously so as to provide zeta ($\zeta$) function 306 uniformity and further to minimise xi ($\xi$) function 308 uniformity. Advantageously the AIU and ACU of slanted lens multiview displays can be enhanced, while increasing 3D and 2D image quality and reducing the cost of the optical components for the reasons described above.

Throughout this description, the pixel aperture may be defined by a single layer such as the black mask layer formed by the light blocking layers 106 and 108. Advantageously, such an arrangement provides improved tolerance to manufacture compared to structures in which the pixel aperture is defined by multiple layers. The position of the bump feature 104 however will be defined by a separate layer compared to the black mask layer. In this case, the alignment of the black mask during assembly is advantageously set to be laterally aligned with the bump feature 104. Advantageously, the layer comprising the bump features 104 may be positioned on the same substrate as the black mask layer.

What is claimed is:

1. An autostereoscopic display apparatus comprising:
   a spatial light modulator having an array of individually addressable pixels of different colors arranged in rows and columns, each pixel comprising at least one aperture that contains liquid crystal and has an alignment feature arranged to provide radially symmetric alignment of the molecules of the liquid crystal; and
   a parallax element comprising an array of optical elements arranged over the spatial light modulator to direct light from the pixels into different viewing windows, the optical elements having geometric axes extending in parallel across the spatial light modulator transversely to said rows in which the pixels are arranged;
   wherein the apertures are shaped such that a notional line parallel to the geometric axes of the optical elements has a total length of intersection with the pixels of the same color that are adjacent along the notional line, which total length of intersection is the same for all positions of the notional line when the length of intersection is weighted across said alignment features by the intensity of light modulated by the alignment feature expressed as a fraction of the intensity of light modulated by the remainder of the pixel.

2. The autostereoscopic display apparatus according to claim 1, wherein each pixel comprises plural apertures, each of which comprises liquid crystal and a said alignment feature in the liquid crystal, wherein the alignment features of the apertures of each individual pixel are offset from one another in a direction perpendicular to said geometric axes.

3. The autostereoscopic display apparatus according to claim 2, wherein each pixel comprises at least two apertures that overlap in said direction perpendicular to said geometric axes.

4. The autostereoscopic display apparatus according to claim 3, wherein the portions of said at least two apertures that overlap each have at least one parallel side that is inclined with respect to the direction parallel to the geometric axes of the optical elements.

5. The autostereoscopic display apparatus according to claim 1, wherein pixels that are adjacent one another in a row comprise respective apertures that overlap in said direction perpendicular to said geometric axes.

6. The autostereoscopic display apparatus according to claim 1, wherein the intensity of light modulated by the alignment feature is zero so that the length of intersection is weighted to zero across said alignment features.

7. The autostereoscopic display apparatus according to claim 1, wherein the alignment features are bump features that protrude into the liquid crystal.

8. The autostereoscopic display apparatus according to claim 1, wherein the spatial light modulator comprises a layer of liquid crystal contained between two substrates.

9. The autostereoscopic display apparatus according to claim 8, further comprising a light blocking layer defining said array of pixels in the liquid crystal layer.

10. The autostereoscopic display apparatus according to claim 1, wherein said alignment features are each formed on one substrate.

11. The autostereoscopic display apparatus according to claim 1, wherein the rows and columns in which the pixels are arranged are perpendicular.

12. The autostereoscopic display apparatus according to claim 1, wherein the geometric axes extending in parallel across the spatial light modulator are perpendicular to said rows in which the pixels are arranged.

13. A spatial light modulator comprising:
a plurality of pixels, each comprising:
at least one aperture having a first alignment feature compensation feature; and
at least one alignment feature aligning with the first alignment feature compensation feature with respect to a notional line.

14. The spatial light modulator according to claim 13, wherein each of the plurality of pixels further comprises a second alignment feature compensation feature, and the at least one alignment feature is aligned with the second alignment feature compensation feature with respect to the notional line.

15. The spatial light modulator according to claim 13, wherein the aperture contains liquid crystal.

16. The spatial light modulator according to claim 13, wherein the notional line is a horizontal or a vertical.

17. The spatial light modulator according to claim 13, wherein a tab length of the first alignment feature compensation feature is smaller than or the same as a length of the alignment feature.

18. The spatial light modulator according to claim 13, wherein the aperture further has:
a horizontal top edge;
two inclined edges connected with two ends of the horizontal top edge, respectively; and
a bottom edge, wherein the bottom edge and the first alignment feature compensation feature are integrated.

19. An autostereoscopic display apparatus comprising:
a spatial light modulator comprising:
a plurality of pixels, each comprising:
at least one aperture having a first alignment feature compensation feature; and
at least one alignment feature aligning with the first alignment feature compensation features with respect to a notional line; and
a parallax element comprising an array of optical elements arranged over the spatial light modulator.

* * * * *